United States Patent
Ogasawara

[19]

[11] Patent Number: 5,966,159
[45] Date of Patent: *Oct. 12, 1999

[54] METHOD AND APPARATUS FOR ADJUSTING AN APPARATUS USING LIGHT SOURCE AND RECORDING APPARATUS ADJUSTED THEREBY

[75] Inventor: Yoshimi Ogasawara, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/447,754

[22] Filed: May 23, 1995

[30] Foreign Application Priority Data

May 24, 1994 [JP] Japan .................................. 6-109688

[51] Int. Cl.$^6$ .............................. B41J 2/47; B41J 2/435; G03B 27/52; G03B 27/72
[52] U.S. Cl. ............................. 347/133; 347/246; 355/41
[58] Field of Search ..................................... 347/246, 236, 347/132, 133; 355/27, 28, 29, 40, 41, 42, 43

[56] References Cited

U.S. PATENT DOCUMENTS

| Re. 33,836 | 3/1992 | Resor, III et al. ........................ 355/43 |
|---|---|---|
| 4,365,171 | 12/1982 | Archer .................................... 307/253 |
| 4,959,606 | 9/1990 | Forge ..................................... 323/286 |
| 5,025,322 | 6/1991 | Ng ......................................... 358/298 |
| 5,126,761 | 6/1992 | Asada ..................................... 346/108 |
| 5,220,348 | 6/1993 | D'Aurelio ............................. 346/76 L |
| 5,379,177 | 1/1995 | Bird ........................................ 361/118 |
| 5,491,534 | 2/1996 | Shiozawa .................................. 355/69 |
| 5,504,517 | 4/1996 | Takashi et al. ........................ 347/246 |
| 5,508,729 | 4/1996 | Yamazaki ................................ 347/247 |
| 5,565,818 | 10/1996 | Robbins et al. .......................... 331/78 |
| 5,579,044 | 11/1996 | Warner et al. ......................... 347/236 |
| 5,593,722 | 1/1997 | Otani et al. ............................. 427/101 |
| 5,812,892 | 9/1998 | Miyoshi et al. ........................ 396/548 |

FOREIGN PATENT DOCUMENTS 56-107264  8/1981  Japan .
63-153166  6/1988  Japan .

OTHER PUBLICATIONS

E.J. Kennedy, Operational Amplifier Circuits Theory and Applications, pp. 443–451, 1988.

Primary Examiner—Safet Metjahic
Assistant Examiner—Christopher E. Mahoney
Attorney, Agent, or Firm—Fitzpatrick, Cella, Harper & Scinto

[57] ABSTRACT

An adjusting apparatus and method for adjusting a recording device such as a color laser printer or copier. The recording device has a light emitting device, an electrical resistance device, and a controlling device. The controlling device controls the emission period of the light emitting device according to the resistance of the electrical resistance device. The adjusting apparatus has a controller that controls the light emitting device of the recording device to be in a predetermined active state. The adjusting apparatus also has an adjusting device that adjusts the resistance of the electrical resistance device in accordance with the light emission intensity of the light emitting device. A recording device that is readily adjusted by such an adjusting apparatus is also disclosed.

34 Claims, 25 Drawing Sheets

TX—CHARACTER IMAGE (600 LINES)
PH—PHOTOGRAPH IMAGE (300 LINES)

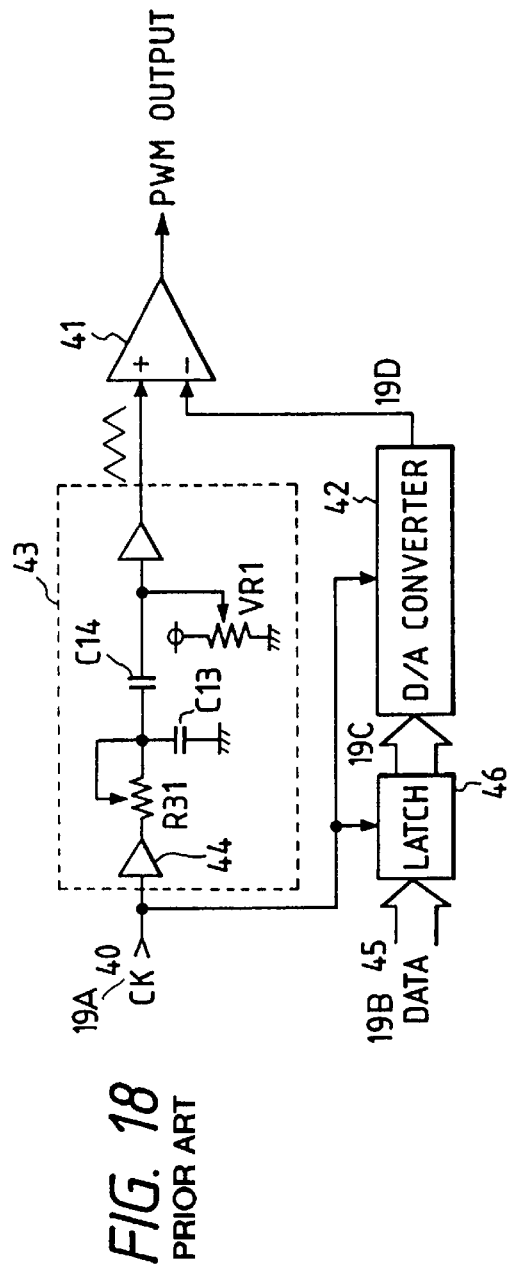
FIG. 18 PRIOR ART
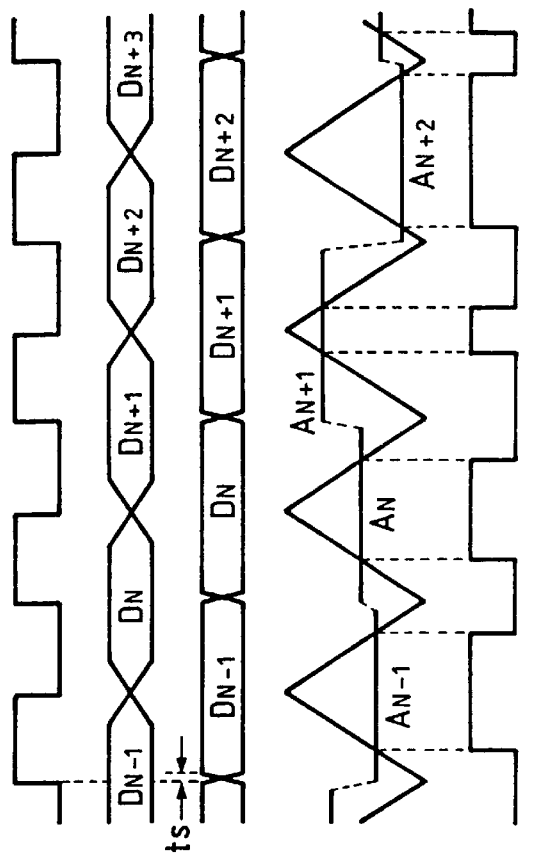
FIG. 19A PRIOR ART
FIG. 19B PRIOR ART
FIG. 19C PRIOR ART
FIG. 19D PRIOR ART
FIG. 19E PRIOR ART

| FIG. 22A |
| FIG. 22B |

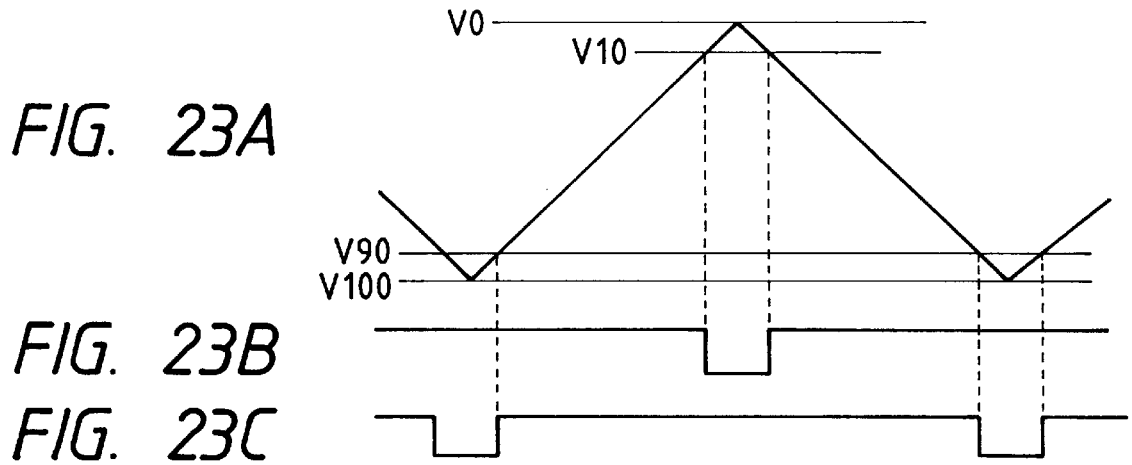
FIG. 23A
FIG. 23B
FIG. 23C
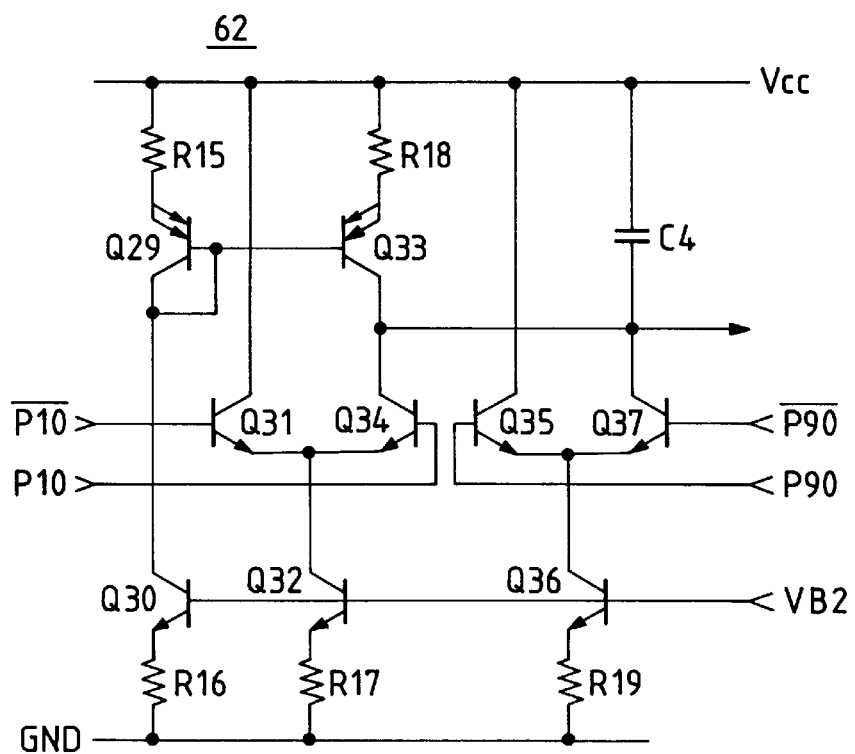
FIG. 24

METHOD AND APPARATUS FOR ADJUSTING AN APPARATUS USING LIGHT SOURCE AND RECORDING APPARATUS ADJUSTED THEREBY

BACKGROUND OF THE INVENTION

1. Field of the Invention

The present invention relates to method and apparatus for adjusting an apparatus using a semiconductor laser used in a recording apparatus such as an electrographic laser printer or a digital copying machine.

More particularly, the present invention relates to a method for adjusting a firing time when such a light source is fired for each pixel and an apparatus used therefor and a recording apparatus suitably adjusted by the method. Further, specifically, the present invention is preferably implemented in a recording apparatus in which a light source is fired for a time in accordance with each pixel density level.

2. Related Background Art

A color page printer using an electrographic system has been attracting an interest because of its high quality, multiple of tones and high printing speed. For a full color laser page printer, a process of scanning a laser beam along a main scan line to conduct first development and then transferring a resulting latent image onto a record sheet on a transfer carrier is repeated four times to conduct multi-color printing. The four processes correspond to recording processes for Y (yellow), M (magenta), C (cyan) and K (black).

In such a color page printer, because of present electrographic process technology and toner diameter, different processes are used for a natural image (halftone image) such as a photograph and a character image (binary image) in order to enhance the print qualities thereof. Namely, for the character image, the printing is made at 400 to 600 dpi(dots per inch) putting a priority on a resolution and for the natural image, the printing is made at 400 to 600/N lines with N pixels in a set to put a priority to the tonality.

Recently, a multi-value printout printer in which halftone image data from a host computer is received as non-binary (for example, dither system) multi-value image data by 8 bits per pixel, and a light source is modulated by a pulse width modulation signal for each pixel has been put into practice.

As a light source unit for such a color printer, a semiconductor laser unit having a collimator lens for converting a diverging light beam from a semiconductor laser to a collimated light beam is frequently used. A laser exit light from the semiconductor laser forms an electrostatic latent image on a photo-conductor through scanning means and focusing means and it is transferred to a recording sheet to form an image printout. Such a semiconductor laser unit is usually mounted in a scanner of the color page printer.

In order to present constant density printing in a print operation by the printer using the above pulse width modulation method, it is necessary to continuously control an output power of the semiconductor laser to a standard power setting. To this end, in the prior art, a feedback control loop as shown in FIG. 15 is formed to conduct light intensity control (APC). Namely, a back beam which is proportional to a light intensity of a semiconductor laser 137' is sensed by a monitoring photodiode 138' and an output value S138 thereof is compared with a reference value Vt by a signal comparator 130' to adjust a drive current of the semiconductor laser 137' such that both values match.

However, in a mutual relation between the output power of the semiconductor laser 137' and the light intensity detection value S138 of the monitoring photodiode 138', a variation of a scanning optical system including the semiconductor laser unit has an noticable amount due to a variation of a divergence angle of the semiconductor laser 137', a variation of a relative positional balance and sensitivities of the monitoring photodiode S138' and the semiconductor 137', a variation of a scanning system efficiency such as a collimator lens, a variation of linearity of a light intensity of the semiconductor laser 137' to input drive data and a variation of a filtering characteristic of the light intensity due to mismatching of an operational specific resistance in a chip of the semiconductor laser 137' and a pattern impedance of a drive circuit.

When such variations are included, a predetermined laser power for the input data from the host computer is not produced on the printer. As a result a print density varies from semiconductor laser unit to unit and sufficient tonality to represent the pulse width modulated data is not attained.

Thus, an output power of a front beam of the semiconductor laser 137' is measured by an optical power meter at a position corresponding to a mount position of a photoconductor which is a final illumination position of the laser beam to adjust a drive current of the laser drive circuit 134', and an amplification gain of the monitor output used in the APC operation of the recording apparatus is adjusted such that the laser power at the photo-conductor mount position matches to the standard power setting, and a correction is made such that the monitor detection value S138 matches to the reference value Vt.

For the pulse width modulation, like the APC operation, the output power of the front beam of the semiconductor laser 137' is measured by the optical power meter at the photo-conductor mount position which is the final illumination position of the laser beam, and the signal pulse width is adjusted such that average laser powers by modulation signals of a minimum pulse width and a maximum pulse width generated from a pulse width modulation generator (not shown) match to reference values Vp(min) and Vp(max).

In the above color page printer, an optimum resolution (hereinafter referred to as the number of lines) is different between the character image and the natural image, and for the pulse width adjustment, a minimum pulse width and a maximum pulse width are adjusted for each of different numbers of lines.

FIGS. 16 and 17 illustrate a relation between the pulse width adjustment and the photo-conductor surface. A pulse waveform shown by (1) in FIG. 16 is a theoretical laser emission response waveform having a target value at a laser beam energy and (2) shows a relation between a laser output light intensity and the pulse width adjustment when a light intensity energy to a minimum pulse width modulation signal (data from the host computer is 'OOh') is under. A waveform (3) shows a relation between the laser output light intensity and the pulse width adjustment when the light intensity energy is over. FIG. 17 is a graphic representation of the mutual relation of (1)–(3) of FIG. 16.

A PWM pixel modulation method for a laser beam printer (LBP) has been known in the art, in which a laser beam radiation time is controlled for each pixel to obtain a light amount correlated to the printing density (deposited toner amount) suitable for a highly fine (high gradation) video image.

FIG. 18 illustrates such a pixel modulation. A video clock (FIG. 19A) representing a pixel unit and synchronizing with a beam detect (BD) pulse indicating a horizontal reference position of a printing sheet, is inputted to an input terminal 40. The video clock signal is converted into a ramp wave (FIG. 19D) synchronously with the video clock signal, and the ramp wave signal is supplied to a comparator 41. Pixel data (FIG. 19B) of eight bits, for example, is inputted to an input terminal 45, the pixel data being used for determining the printing density of each pixel. The input pixel data is latched (FIG. 19C) by a latch 46 in response to the video clock. An output of the latch 46 is converted into an analog voltage (FIG. 19D) by a D/A converter 42, the analog voltage being supplied to the comparator 41. As shown in FIG. 19D, the comparator 41 compares the input ramp wave signal with the pixel analog voltage to output a laser drive pulse (FIG. 19E) pulse width modulated in accordance with the density of pixel data.

A laser beam is radiated, for example, while the laser drive pulse takes an H level. Therefore, the pixel data DN+2 corresponds to a 'deep pixel', and the pixel data DN corresponds to a 'light shaped pixel'. The printing density is very sensitive to a pulse width (radiation time). For a high image quality, it is therefore necessary not only to be able to change a peak level value and a DC offset value of the ramp wave in accordance with the environmental conditions, but also to make the ramp wave stable.

In the ramp wave generator circuit 43 shown in FIG. 18, the video clock is shaped by a buffer 44 to eliminate noises such as ringing, and transformed into a ramp wave by a time constant circuit having a time constant T=R31*C13 which is larger than a clock period.

The level of the ramp wave can be set by the resistance value of R31, and the DC offset can be set by VR1 with a sufficiently large capacitance of C14. In order to ensure the linearity of the ramp wave slope, it is necessary to set the time constant T about three times the video clock period.

In the method for finely adjusting the semiconductor laser beam power by varying the pulse width of the pulse width modulation signal as the potentiometers VR1 and R31 are rotated for the multi-tone reproduction such that an integrated light energy reached a predetermined level, the following problems are encountered:

(1) For the pulse width modulator, when the ramp wave from the ramp wave generation means 43 and the DA-converted value of the data from the host computer are compared by the comparator 41 to generate the pulse width modulation signal, the data are set to "00h" (h represents hexadecimal) corresponding to a lowest density and "FFh" corresponding to a highest density and the potentiometers VR1 and R31 are adjusted to adjust the maximum pulse width and the minimum pulse width.

In this case, the two adjustment units are formed by potentiometers and optimum control is required for each of the character image and the natural image. Accordingly, a total of four potentiometer adjustments are required in connection with the pulse width modulation.

Further, in the adjustment by the potentiometer, it is necessary to lock the potentiometer by paint so that the adjusted position is not changed by mechanical vibration after the adjustment.

(2) It is difficult to automate the power adjustment and the adjustment takes time because there are four adjustments in connection with the pulse width modulation. In the APC adjustment, the adjustment is made while the laser is DC driven, and in the pulse width adjustment, the adjustment is made while the laser is AC driven by the minimum and maximum pulse width signals so that the light integration energy detected by the optical power meter is small and delicate and sensitive to jitter. Thus, the adjustment takes time. Further, when VR1 is adjusted while the data "00h" is outputted to determine the minimum pulse width and then R31 is adjusted while the data "FFh" is outputted, the minimum pulse width varies, that is, the minimum pulse width and the maximum pulse width cannot be adjusted independently. As a result, the adjustment is not readily attained.

(3) The variable range of the potentiometer may be reduced to facilitate the adjustment of the potentiometer, but when laser chips of different manufacturers are used in common to reduce a cost of the pulse width adjustment unit, the laser characteristic varies from manufacturer to manufacturer and even the laser chip of the same manufacturers vary from lot to lot. In addition, when a variation of the scanning optical system extending to the photo-conductor is taken into consideration, the variable range of the potentiometer cannot be significantly reduced.

Thus, a multi-rotation potentiometer or a pair of potentiometers for coarse adjustment and fine adjustment may be used for each adjustment position (in the above example, eight potentiometers are required) but this results in the increase of a cost of the apparatus.

(4) When a laser light emission time T is sufficiently long relative to a rise time tr and a fall time tf, the light transient response of the semiconductor laser (ringing such as overshoot and undershoot) raises no problem because an error of the light energy produced at the photo-conductor mount position is negligible.

However, for the pulse width modulation signal, particularly for the minimum pulse width data, the laser light emission time T is comparatively short compared with the rise time tr and the fall time tf and the error of the light energy produced at the photo-conductor mount position is not negligible.

In this case, the variation may be absorbed to some extent as shown in FIG. 16 by varying the laser light emission time by the pulse width modulation to adjust the light energy but it is not sufficient. FIG. 20 shows a relation between the pulse width modulation signal, the semiconductor laser response waveform and the light energy on the photo-conductor.

SUMMARY OF THE INVENTION

It is an object of the present invention to provide a light emission intensity adjusting apparatus and a method therefor and a recording apparatus for converging a variation of a light energy due to a difference between laser beam transient responses in accordance with a light response characteristic of a laser light emission element into a predetermined range precisely in a short time.

It is another object of the present invention to provide a light emission intensity adjusting apparatus and method and a recording apparatus for correcting a transmission characteristic by an affect of a variation of an operating resistance of the laser device and a laser circuit pattern to improve a transient response characteristic of the laser device.

In order to achieve the above objects, the present invention provides an adjusting apparatus for an apparatus using a light emitting device comprising: means for maintaining the light emitting device in a predetermined activated state; means for comparing a light emission intensity of the light emitting device controlled by control means, including an electrical resistance device, for controlling a light emission period of the light emitting device, with a reference value;

and adjusting means for adjusting a resistance of the resistance device in accordance with the comparison result such that the light emission intensity of the light emitting diode in the activated state reaches a predetermined value.

Preferably, the adjusting apparatus includes correction means for correcting a transient characteristic of a light response of the light emitting device.

More preferably, the adjusting apparatus further comprises feedback control means including a trimmable resistor having a resistance thereof adjusted by trimming the resistance for maintaining the light emitting device to a predetermined activated state, wherein the feedback control means adjusts the resistance of the trimmable resistor in a pre-stage of the adjustment of the resistance by the adjusting means to adjust an amplification gain of the feedback control.

By the above arrangement, the correction and adjustment of the variation of the light emission power due to a sensitivity error of a light emission monitor negative feedback system of the semiconductor laser device can be conducted precisely in a short time.

It is other object of the present invention to provide a recording apparatus which can be readily adjusted by using the above adjusting apparatus.

It is a further object of the present invention to permit in a recording apparatus having control means for emitting a light for a period determined by a digital value, the adjustment of the control means by using a trimmable resistor element which may be trimmed by a laser beam.

Other objects and effects of the present invention will be apparent from the accompanying drawings, detailed description of the preferred embodiments and appended claims.

BRIEF DESCRIPTION OF THE DRAWINGS

FIG. 18 shows a configuration of a prior art pulse width modulation signal generation unit, FIGS. 19A to 19E show output waveforms in the unit of FIG. 18, FIGS. 22A and 22B, FIGS. 23A through 23C, FIG. 24, FIG. 25, FIG. 26, FIG. 27, and FIG. 28 show a fourth embodiment of the present invention.

DETAILED DESCRIPTION OF THE PREFERRED EMBODIMENTS

First Embodiment

Figure 1:
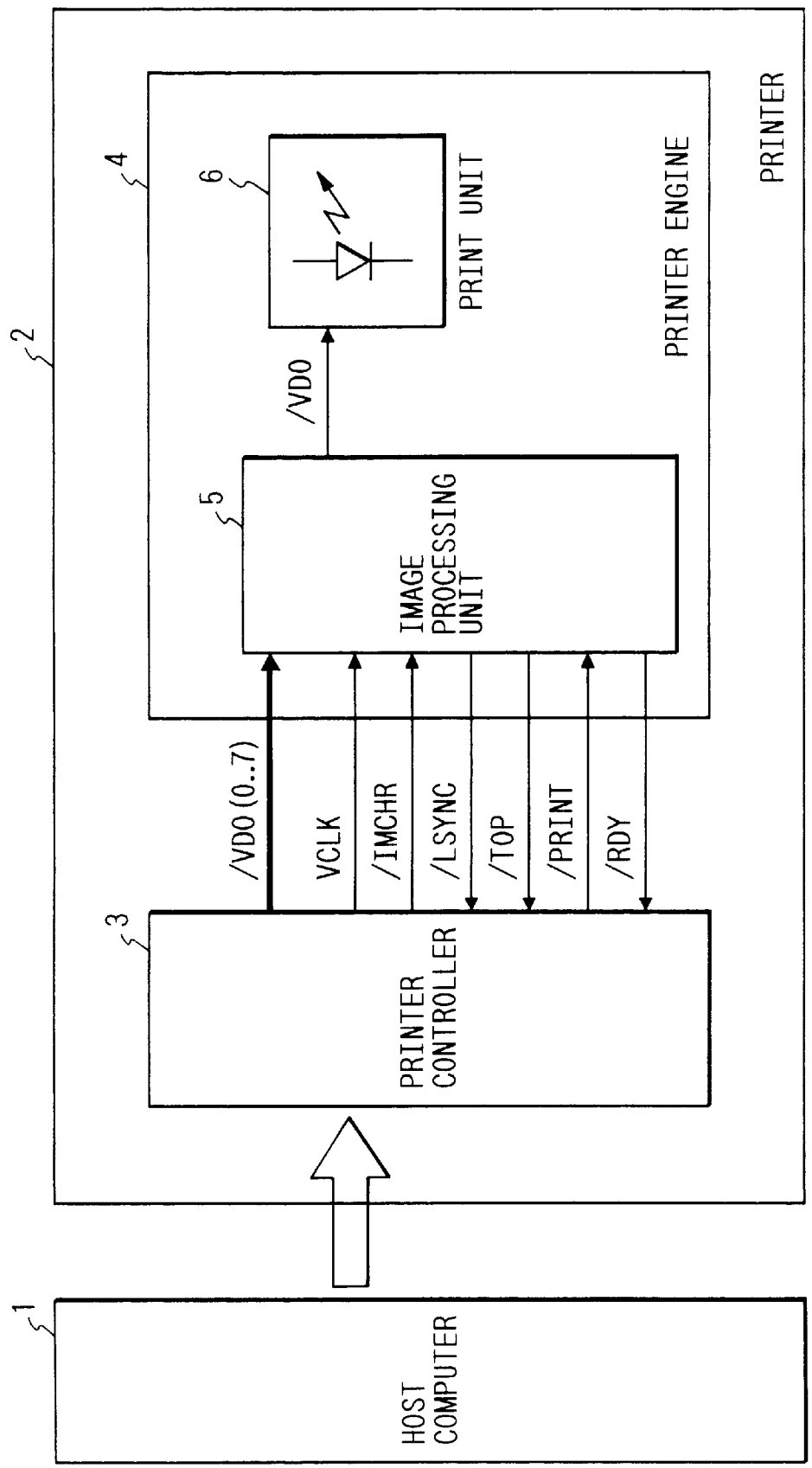
FIG. 1 shows a block diagram of a configuration of a color laser printer in one embodiment of the present invention.

FIG. 1 shows a block diagram of a schematic configuration of a color laser printer in the first embodiment of the present invention. FIG. 1 shows a connection between a host computer 1 and a color laser printer (hereinafter simply referred to as a printer) 2. The printer 2 comprises a printer controller 3 and a printer engine 4.

The printer 2 receives image data (which may be described by a command language such as a page description language) prepared by a predetermined application software from a host computer 1 which is an external unit, develops it into actual print image data (pixel information) by the printer controller 3 and sends image data (/VDO0 to /VDO7) to the printer engine for recording.

In the present embodiment, the printer 2 records the image data sent in plane sequence of magenta (M), cyan (C), yellow (Y) and black (K) and prints a full color image.

Figure 2:
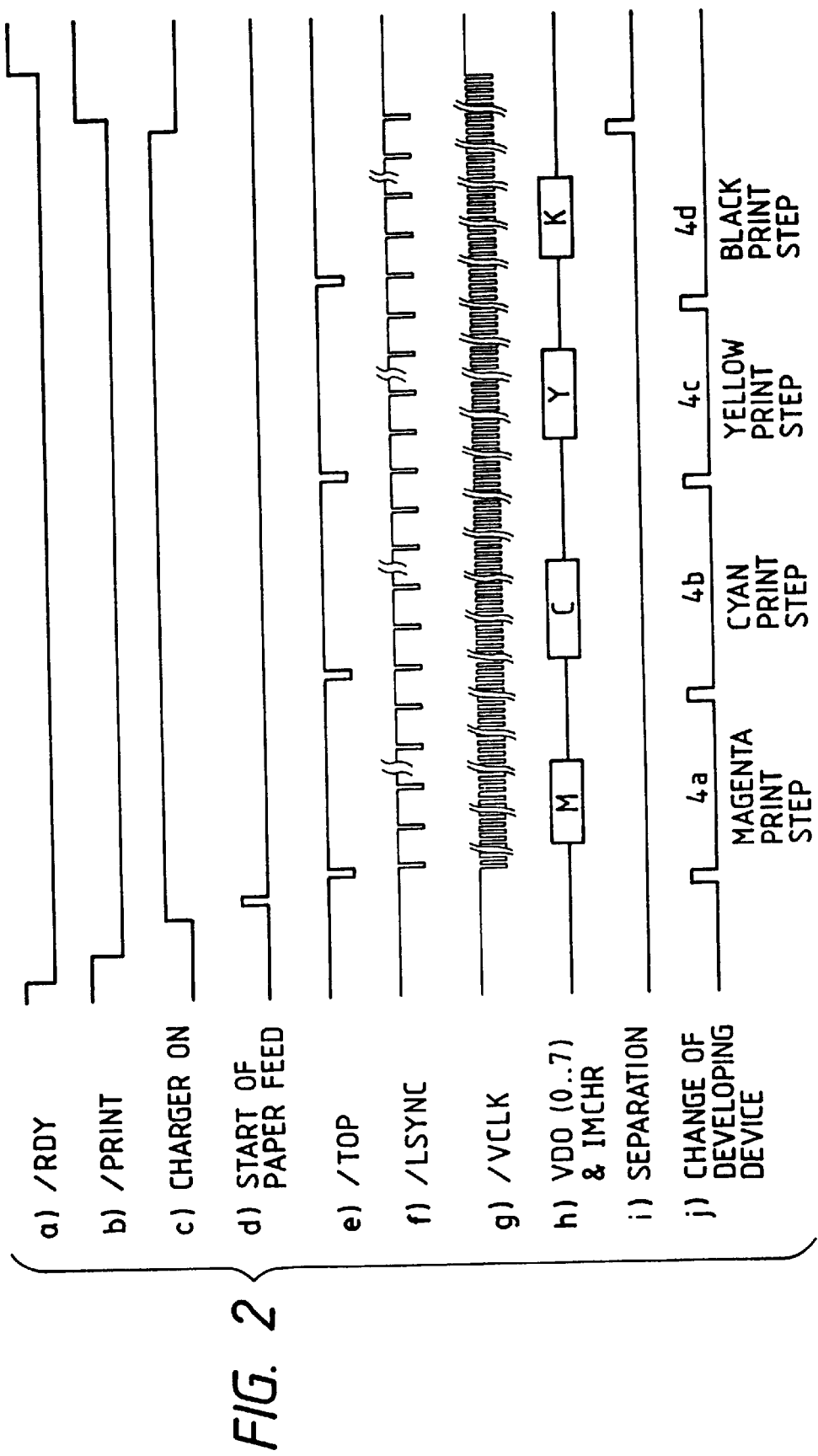
FIGS. 2A to 2J show an operation sequence of the printer of the first embodiment.

FIG. 2 shows an operation sequence of the printer of the present embodiment. As shown in FIG. 2, when the printer controller 3 is ready to send one page of image data, it sends a print start command signal /PRINT to the printer engine 4. In the following description, a symbol "/" added to a signal name indicates that the signal is low active.

The printer engine 4 responses to the /PRINT signal to start the preparation for the print operation. When the print is ready, the printer engine 4 sends a page synchronization signal /TOP for the color M and also sends a main scan line synchronization signal /LSYNC.

In response to those signals, the printer controller 3 sends the image data (/VDO0 to VDO7) for the color M together with a one-bit attribute signal /IMCHR for designating whether the printing is to be made with the priority on the resolution or with the priority on the tonality to the printer engine in synchronism with the data transfer clock /VCLK. In the present embodiment, when the priority is put on the resolution, 600 dpi along the main scan line, and when the priority is put on the tonality, 300 dpi or 200 dpi along the main scan line (hereinafter it is assumed as 300 dpi although it may be switched to 200 dpi. (In either case, 600 dpi along the sub-scan direction.) In other words, for 300 dpi, one dot is formed for two pixels of image signal /VDO0 to /VDO7). In this manner, when the color M data has been sent, the printer controller 3 sequentially conducts the same operation sequence as that of the color M for the colors C, Y and K to form the full color image.

Figure 3:
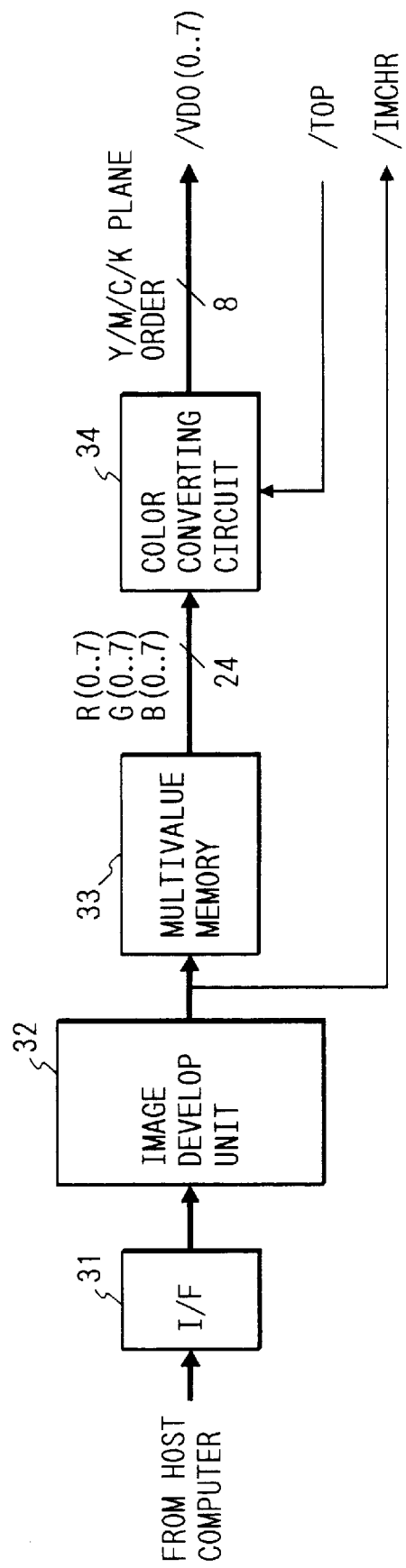
FIG. 3 shows a block diagram of an internal configuration of a printer controller.

FIG. 3 shows a block diagram of an internal configuration of the printer controller 3. As shown in FIG. 1, the image data from the host computer 3 is developed into image data (bit map data) to be actually printed, by an image developing unit 32 through an interface (I/F) unit 31 and the R, G and B pixel 8-bit image data are buffered by a succeeding stage multi-value memory 33.

The R, G and B image data (8 bits each) are masking and undercolor removal (UCR) processed by a color conversion circuit 34 in accordance with a color reproducibility. They are converted to the Y, M, C and K color system and send to the printer engine 4 in synchronism with the signal /TOP. The image developing unit 32 analyzes the received image data to determine whether the priority is put on the resolution or the tonality and sends the result to the printer engine as the one-bit attribute designation signal /IMCHR.

Figure 4:
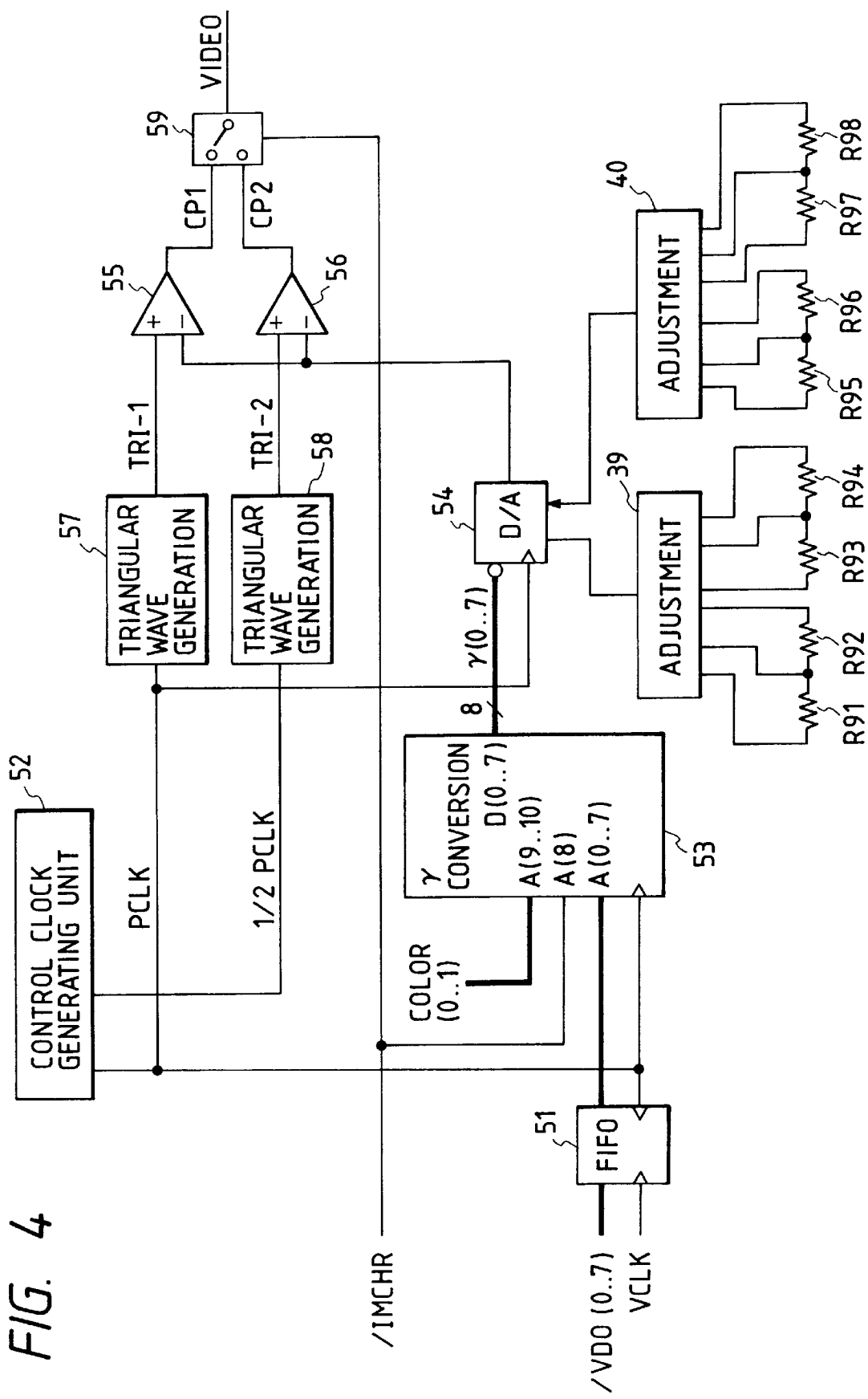
FIG. 4 shows a block diagram of a configuration of an image processing unit in a printer engine.

FIG. 4 shows a block diagram of a schematic configuration of the image processing unit 5 which conducts the multi-value signal processing in the printer engine 4. The image data (/VDO0 to /VDO7) sent from the printer controller 3 is written into a FIFO 51 which is a line memory. The written data is read in synchronism with a rise of a clock signal PCLK generated by a control clock generation unit 52 and supplied to a succeeding stage gamma conversion unit 53.

The gamma conversion unit 53 is a look-up table comprising a RAM or a ROM and the image data read from the FIFO 51 is applied to addresses (A0 to A7) of the gamma conversion unit 53. The /IMCHR signal is applied to the address terminal A8 of the gamma conversion unit 53 and a 2-bit color designation signal COLOR is applied to the addresses A9 to A10. The gamma conversion unit 53 stores gamma conversion data of the M, C, Y and K colors on a 600-line for the character print and gamma conversion data of the M, C, Y and K colors on a 300-line for the natural image.

One of 600-line and the 300-line is selected by the /IMCHR signal of the signals applied to the address terminals, the tables are switched and selected in the sequence of M, C, Y and K in synchronism with the /TOP signal by the color designation signal COLOR.

The 8-bit data outputted from the gamma conversion unit 53 is converted to an analog signal by a D/A converter 54 and it is supplied to inverting input terminals (−terminals) of succeeding stage comparators 55 and 56. On the other hand, ramp waves generated by ramp wave generator 57 and 58 are supplied to noninverting input terminals (+terminals) of the comparators 57 and 58.

Figure 5:
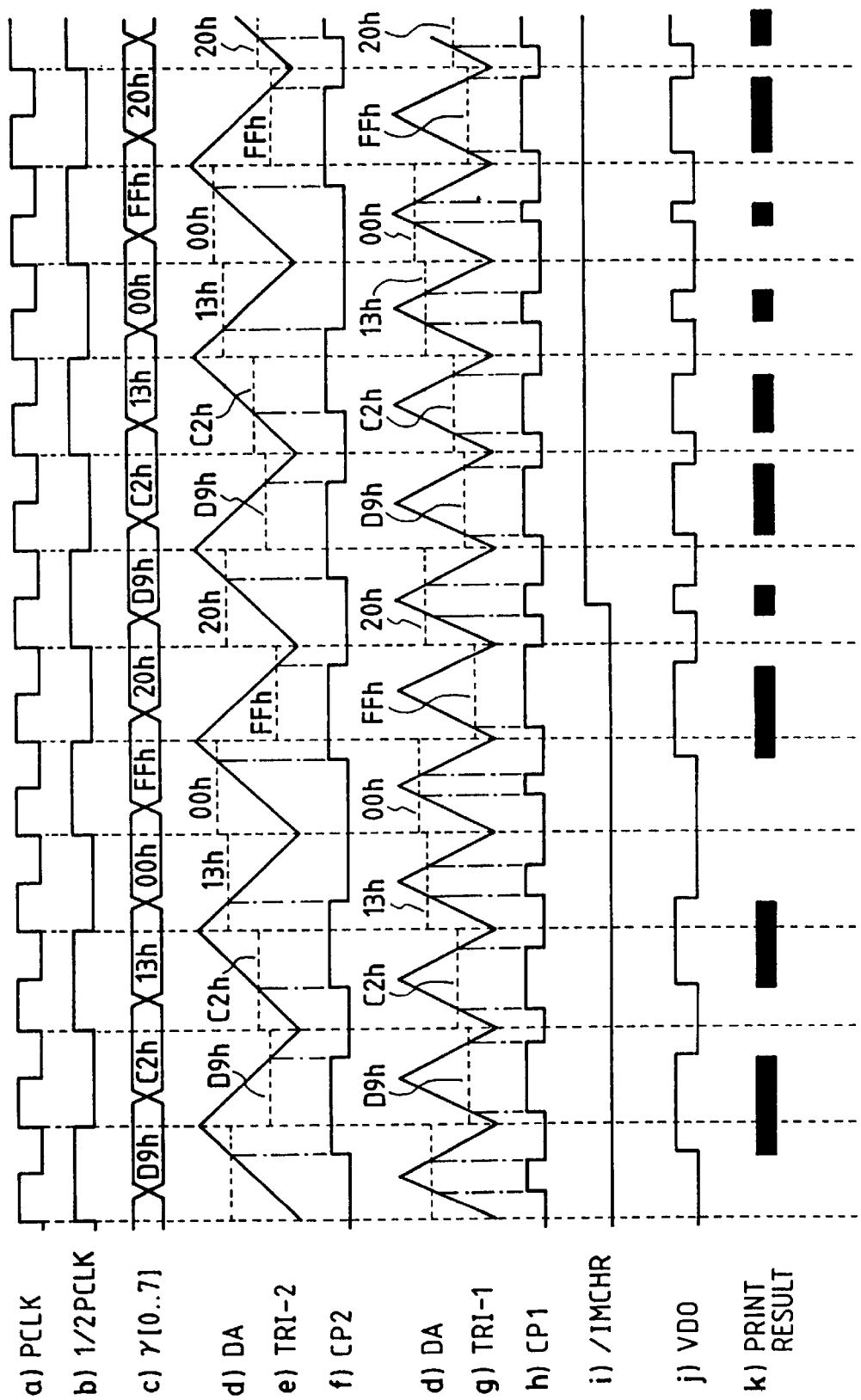
FIGS. 5A to 5K show a timing chart of pulse width signal generation in the first embodiment.

As seen from a timing chart of the pulse width signal generation shown in FIG. 5, the ramp wave generator 57 converts the PCLK to a ramp wave TRI-1 by an integration circuit and the ramp wave generator 58 converts the (½) PCLK which is frequency-divided by two to a ramp wave TRI-2 by an integration circuit and outputs it. The comparators 55 and 56 outputs the pulse width modulation signals CP1 and CP2, respectively, which are logical 1 only when the level of the ramp wave exceeds the output level from the D/A converter 54.

The pulse width signal CP1 in which the pulse growths from the center on the 600-line is applied to one terminal of a selector 59 from the comparator 55, and the pulse width signal CP2 in which the pulse growths from the center on the 300-line is applied to the other terminal of the selector 59 from the comparator 56. The one-bit attribute designation signal /IMCHR is supplied to the selector 59 and the output thereof is supplied to a laser drive unit in a succeeding stage printer 6 (see FIG. 1).

Figure 6:
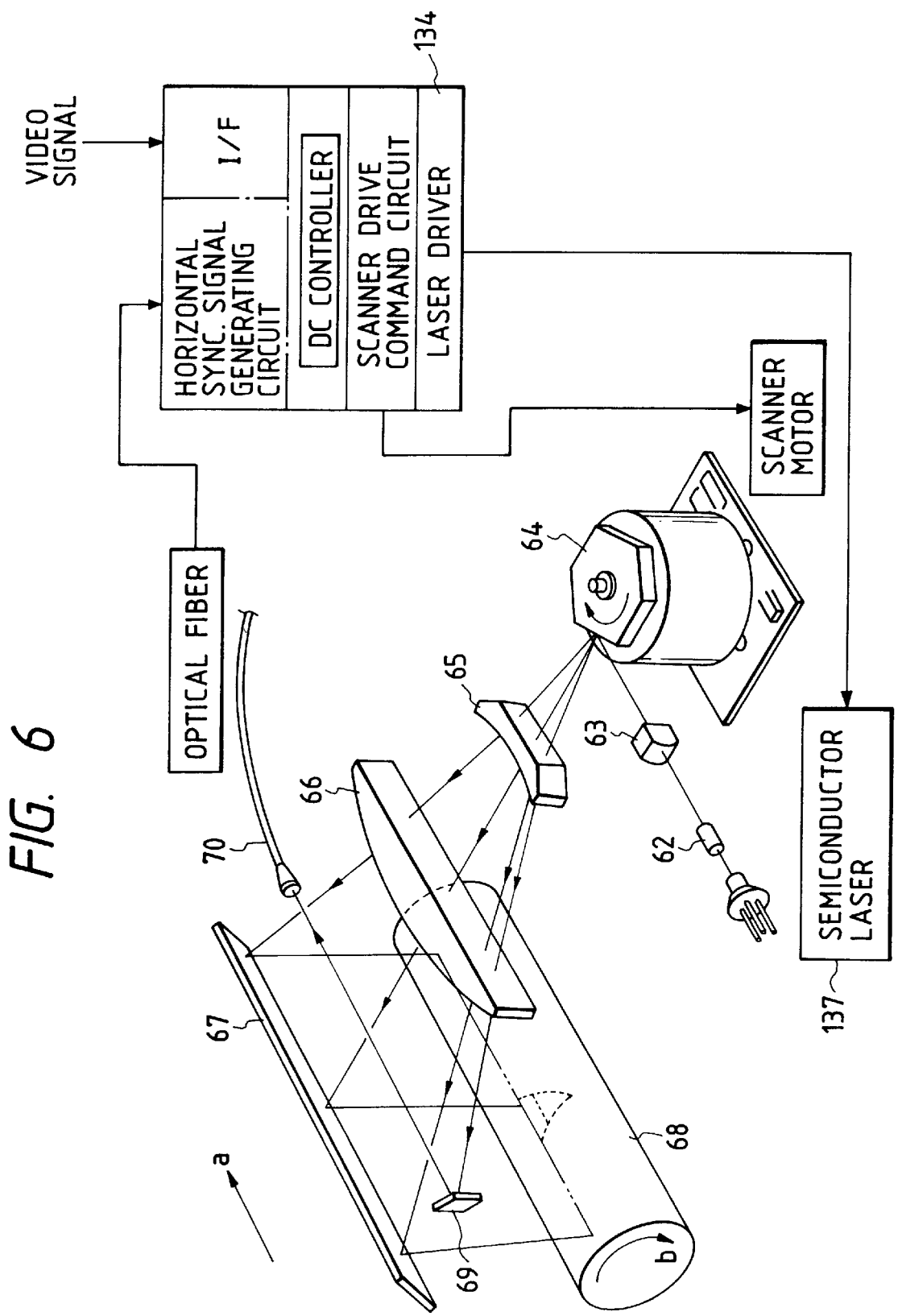
FIG. 6 shows a block diagram of a scanning optical system.

FIG. 6 shows a scanning optical system of the laser beam in the printer in the present embodiment. In FIG. 6, a semiconductor laser 137 which forms the laser beam scanning optical unit is light-modulated by the image signal inputted from the laser drive unit 134. The laser beam emitted from the semiconductor laser 137 is deflected by a rotating polygon (polygon mirror) 64 through a collimator lens 62 and a cylindrical lens 63.

The deflected laser beam is focused by an F-θ lens comprising a spherical lens 65 and a torric lens 66 and a beam light path is changed by a reflection mirror 67 and the beam is irradiated to the photo-conductor 68. The beam is sequentially scanned in the main scan direction a and the sub-scan direction b on the photosensitive member at a constant velocity and a predetermined timing to form an electrostatic latent image.

A portion of the laser beam is reflected by a horizontal synchronization mirror (BD mirror) 69 and detected by an optical fiber 70 to generate a BD synchronization signal which determines a main scan timing of the laser beam. This signal is used as a reference signal of the timing in the printer.

The pulse width trimming in the present embodiment is now explained.

Figure 7:
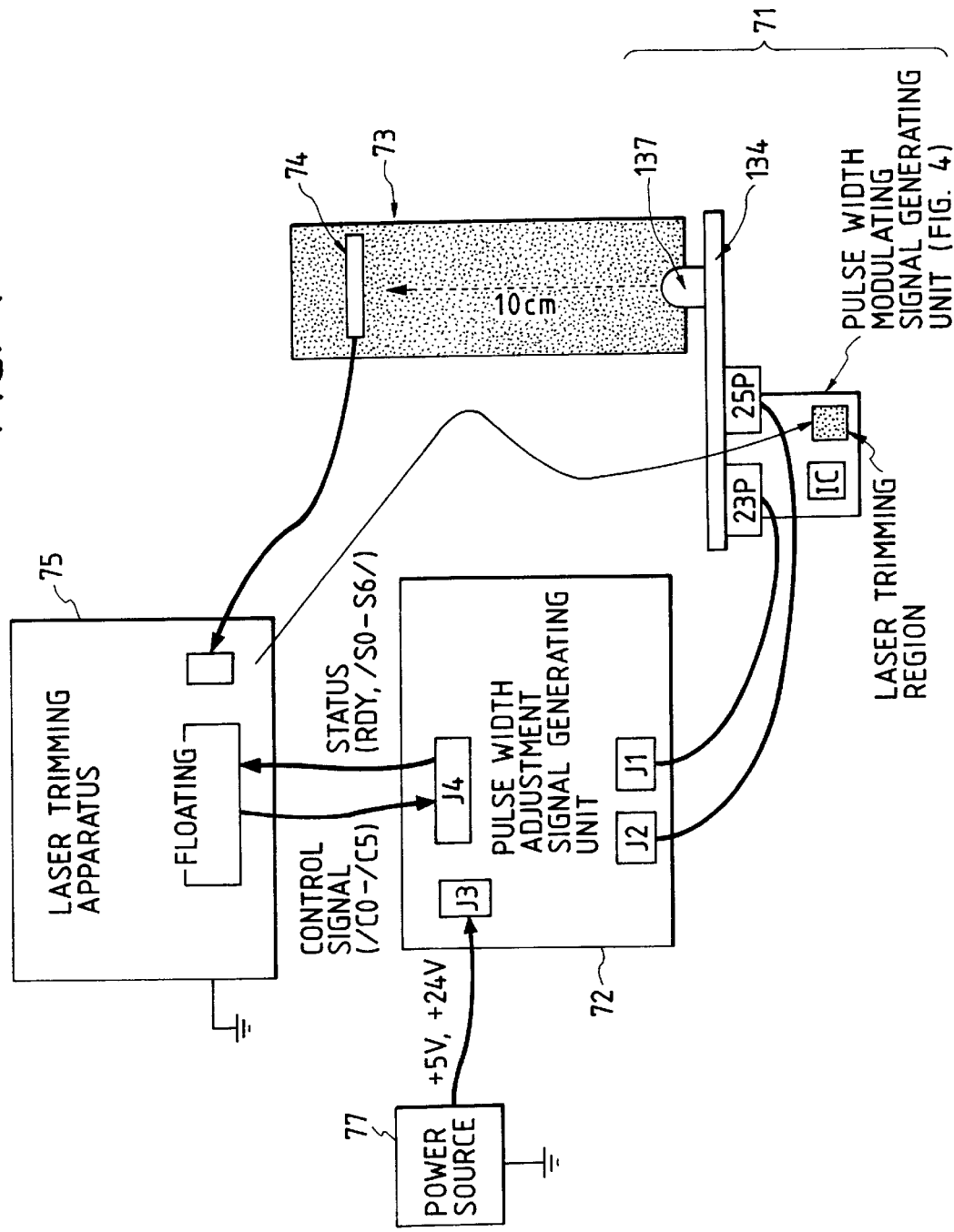
FIG. 7 shows a configuration for conducting pulse width trimming in the first embodiment, FIG. 8 which is comprised of FIGS. 8A and 8B shows a flow chart of an adjustment process in a pulse width trimming apparatus shown in FIG. 7.

FIG. 7 shows a configuration of an apparatus for trimming the pulse width in the present embodiment. As described above, the apparatus comprises a laser unit 71 which integrates the semiconductor laser 137, the collimator lens, the laser driver 134 and the pulse width modulation signal generation unit in one unit. The trimming apparatus comprises the pulse width adjusting signal generation unit 72 for realizing the function of the printer controller 3, a power supply unit 77, a laser barrel (Light shielding box) for preventing affect of a back reflection component of the semiconductor laser, an optical power meter 74 and a laser trimming apparatus 75.

A potentiometer for varying the pulse width in the pulse width modulation signal generation unit comprises trimmable resistors R91 to R98 (FIG. 4) or thick film printed resistors. Four standard setting power references for the minimum and maximum pulse width data in the 600-line mode and the 300-line mode are preset in the laser trimming apparatus 75. Since the output of the optical power meter 74 is a photo-electrically converted voltage, the reference thereof is a voltage.

Status signals /RDY and /S0 to /S6 indicate the status of the pulse width adjustment signal generation unit 72 sent to the laser trimming apparatus 75. Control signals /C0 to /C5 are sent to the pulse width adjusting signal generation unit 72 from the laser trimming apparatus 75 to control the generation of the signal for adjusting the pulse width.

In the laser unit 71, it is assumed that the adjustment of the laser power for the APC operation has been completed.

Figures 8, 8A, 8B:
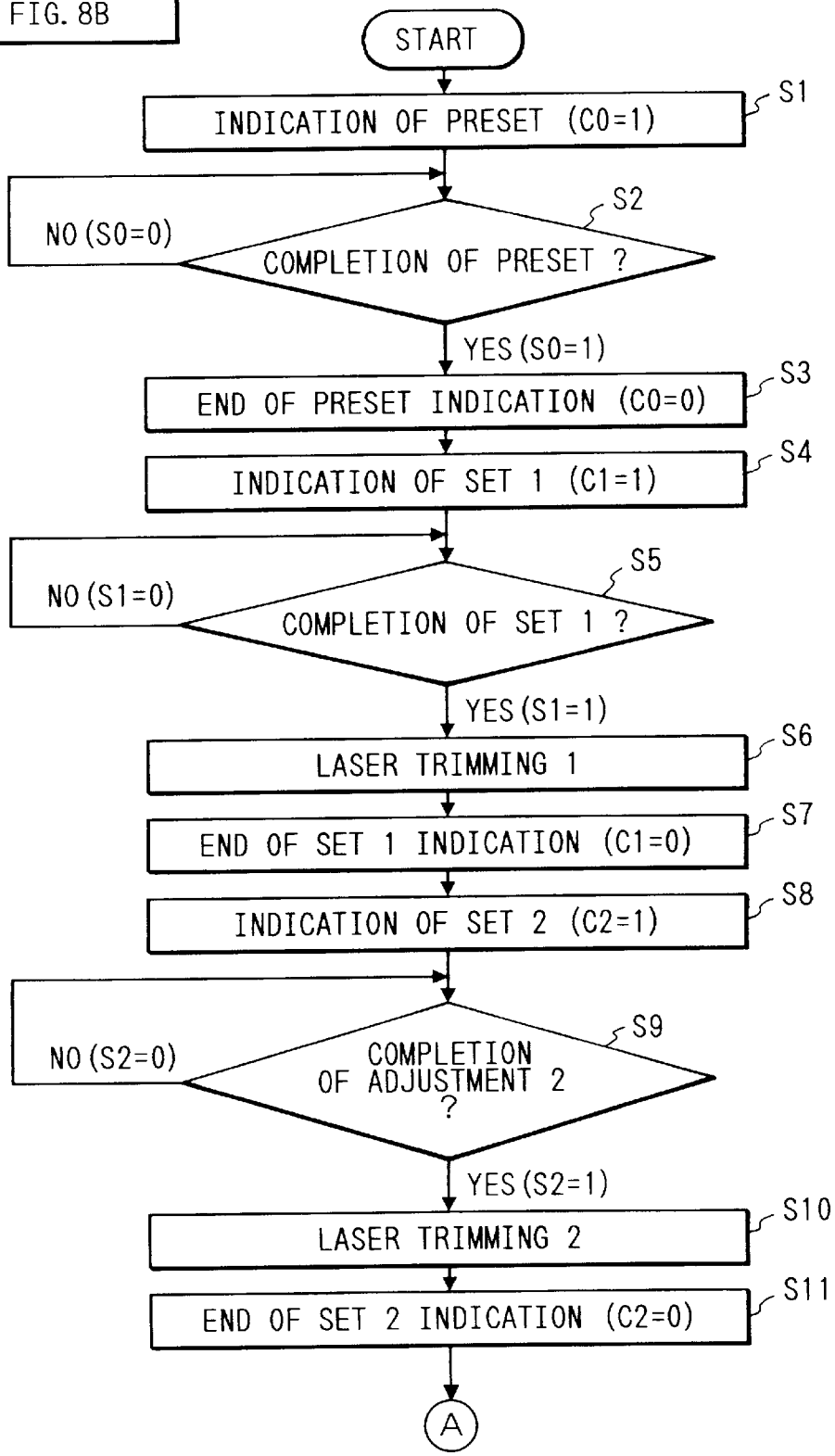
Figure 8B:
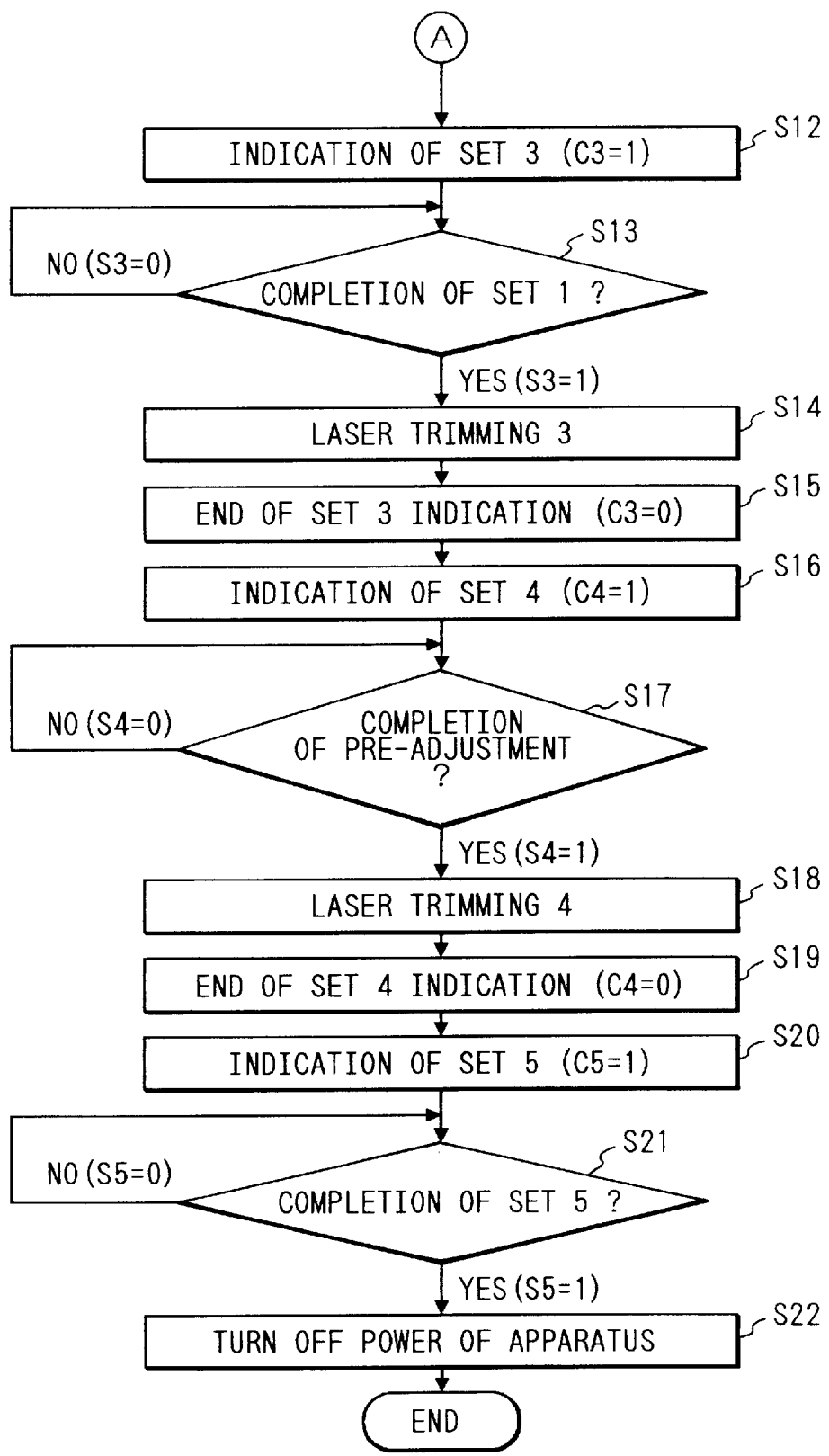
Figure 9:
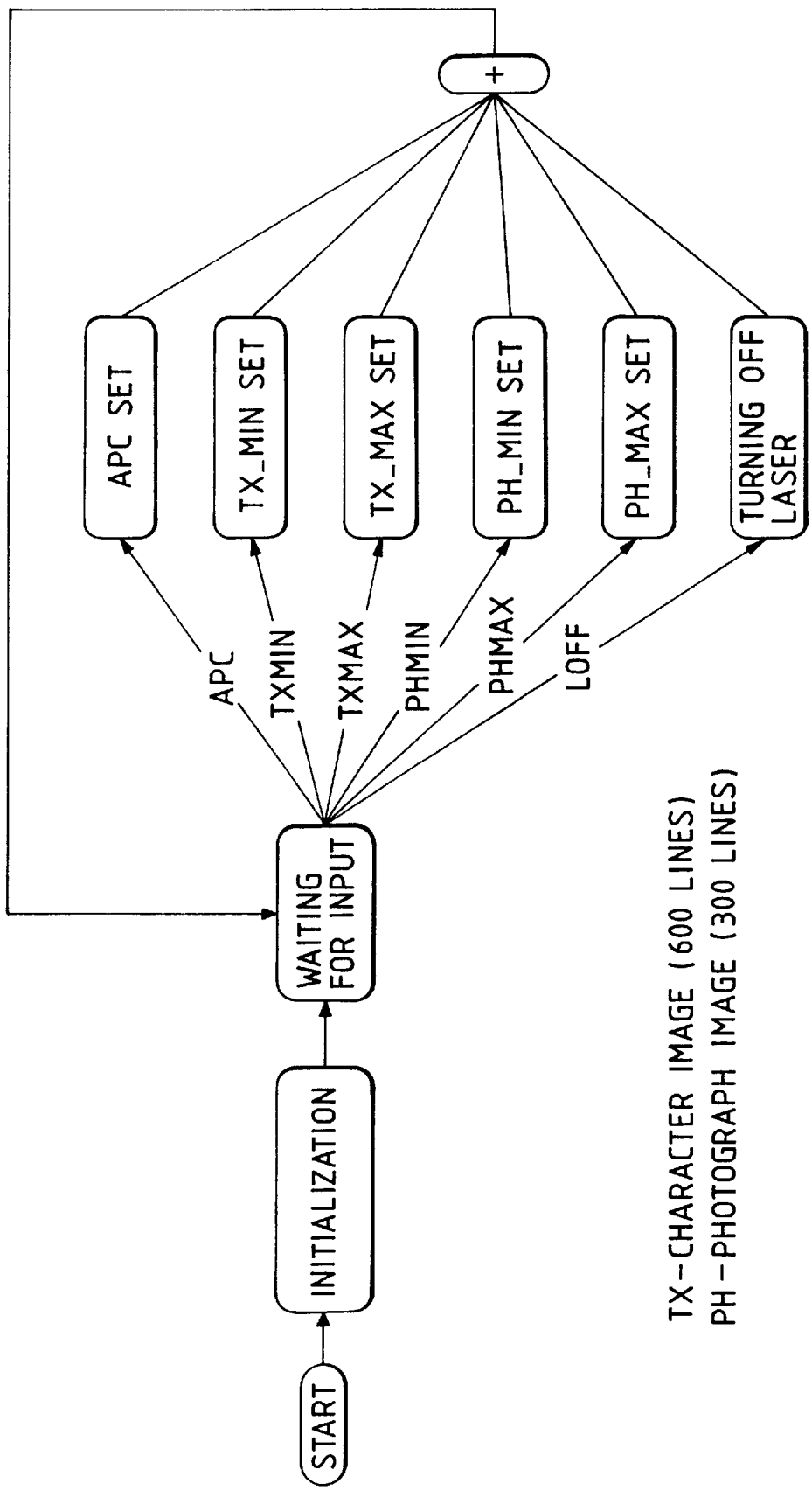
FIG. 9 shows a software state transition chart in the pulse width trimming apparatus.

FIGS. 8A and 8B show flow charts of an adjusting process in the pulse width trimming apparatus shown in FIG. 7. FIG. 9 shows a software status transition chart in the pulse width trimming apparatus.

In FIGS. 8A and 8B, setting 1 to setting 4 in steps S1 to S19 are variable pulse width laser trimming process. A "presetting" corresponds to the APC control similar to that in a conventional printer operation to hold a light emission power of the semiconductor laser in the laser unit 71 mounted on the laser barrel 73 for the trimming to the setting standard value.

A setting 5 in steps S20 to S22 is a post process to turn off the light emission of the laser after the completion of the adjustment. The operations of the setting 1 to setting 4 are different only in target light intensity convergence value and the adjustment operation sequences are same.

Namely, the light emission power of the semiconductor laser in the laser unit 71 mounted on the laser barrel 73 is stabilized by the APC operation prior to the adjustment of the pulse width modulation signal, and then, in the process of the setting 1, the semiconductor laser is modulation-driven by the minimum pulse width data in the 600-line mode. The front beam (the light output through the collimator lens 62 and the laser barrel 73) is received by the optical power meter 74 and the area of the resistor for the variable pulse width adjustment in the pulse width modulation signal generation unit is cut such that the output of the optical power meter 74 matches to the standard setting power reference which is present to the laser trimming apparatus 75.

As the area of the resistor is cut by the trimming, the resistance increases. Thus, in the present embodiment, the resistance of one of the resistors R1 and R2 shown in FIG. 18 is increased by the trimming to increase or decrease the pulse width.

In the setting 2 to setting 4, the semiconductor laser is modulation-driven by the 600-line maximum pulse width and 300-line minimum and maximum pulse width data in the same sequence as that of the setting 1 and the area of the resistor for the variable pulse width adjustment in the pulse width modulation signal generation unit is cut such that the output of the optical power meter 74 matches to the standard setting power references which are preset in the laser trimming apparatus 75.

As described above, according to the present embodiment, the resistance of the variable pulse width adjusting resistor in the pulse width modulation signal generation unit is trimmed such that the light emission power of the semiconductor laser matches to the preset reference so that the variation of the light emission power due to the variation in the semiconductor laser device and the difference in the sensitivity of the light emission monitor negative feedback system of the semiconductor laser is corrected precisely in a short time, and there is no risk of change of the adjustment by the vibration after the adjustment.

Further, the components used for the correction of the variation of the light emission power are inexpensive and the correction and adjustment can be automated.

Second Embodiment

A second embodiment of the present invention is now explained.

Figure 10:
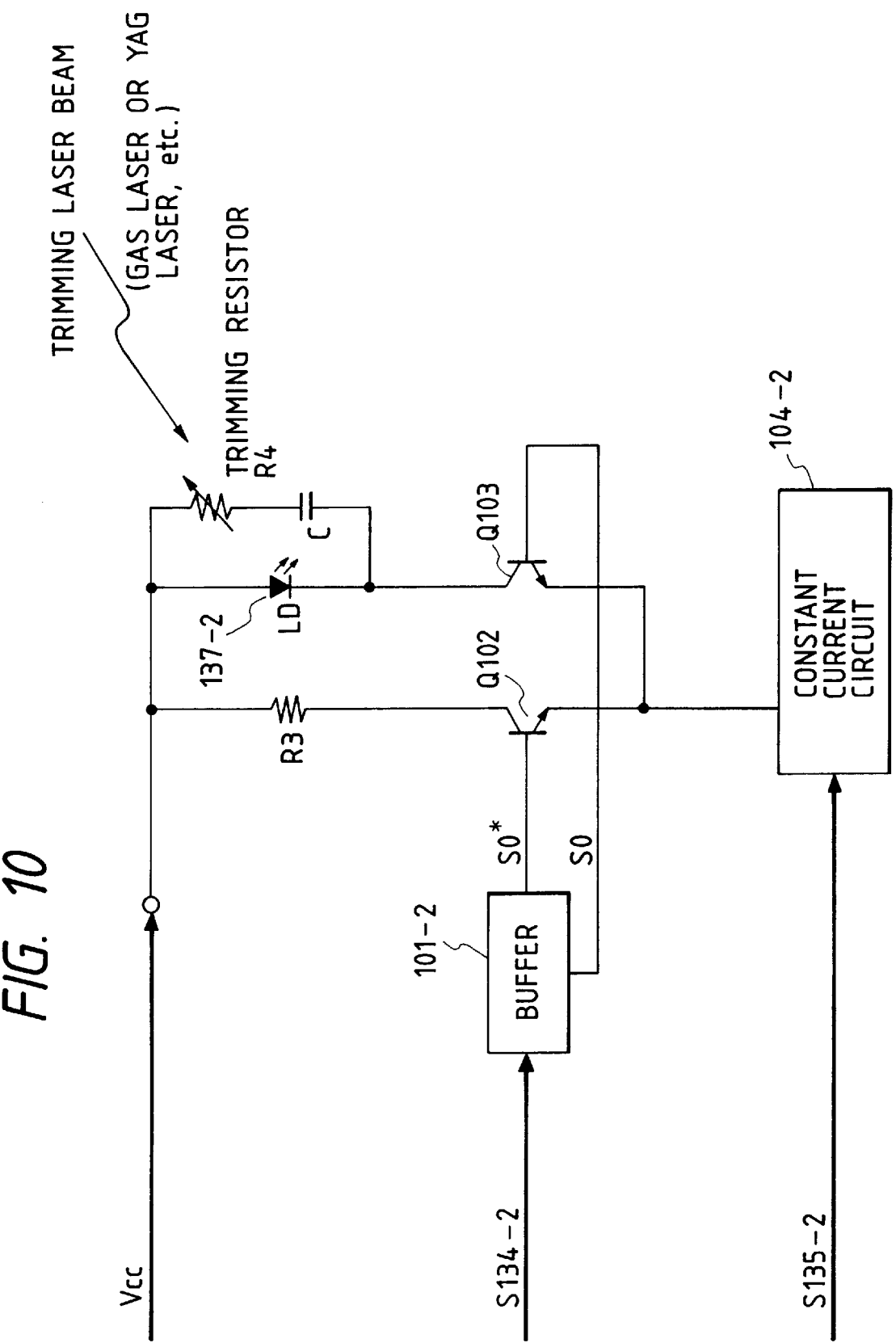
FIG. 10 shows a configuration of a laser drive circuit of a semiconductor laser unit of a color laser printer in a second embodiment of the present invention.

FIG. 10 shows a configuration of a laser drive circuit of a semiconductor laser unit of a color laser printer in the second embodiment of the present invention. In FIG. 10, a constant current circuit 104-2 is a current source for supplying a current to the laser in accordance with a signal S135-2 in order to correct the light emission power of the laser to a predetermined standard setting by the APC by following the variation of the IL characteristic of the laser in accordance with the environment temperature. Transistors Q102 and Q103 form a modulation circuit to switch the laser by a differential operation. Complementary signals S0* and S0 are generated by a buffer 101-2 and they are supplied to base terminals of the transistors Q102 and Q103.

When S0>S0*, the current set by the constant current circuit 104-2 flows a path including the transistor Q103 and the laser LD(137-2) emits a light. When S0<S0*, the current set by the constant current circuit 104-2 flows a path including the transistor Q102 and the laser 137 does not emit a light. In this manner, in the present laser drive circuit, the laser is on/off modulated by the state of the signals S0 and S0*.

Figure 20:
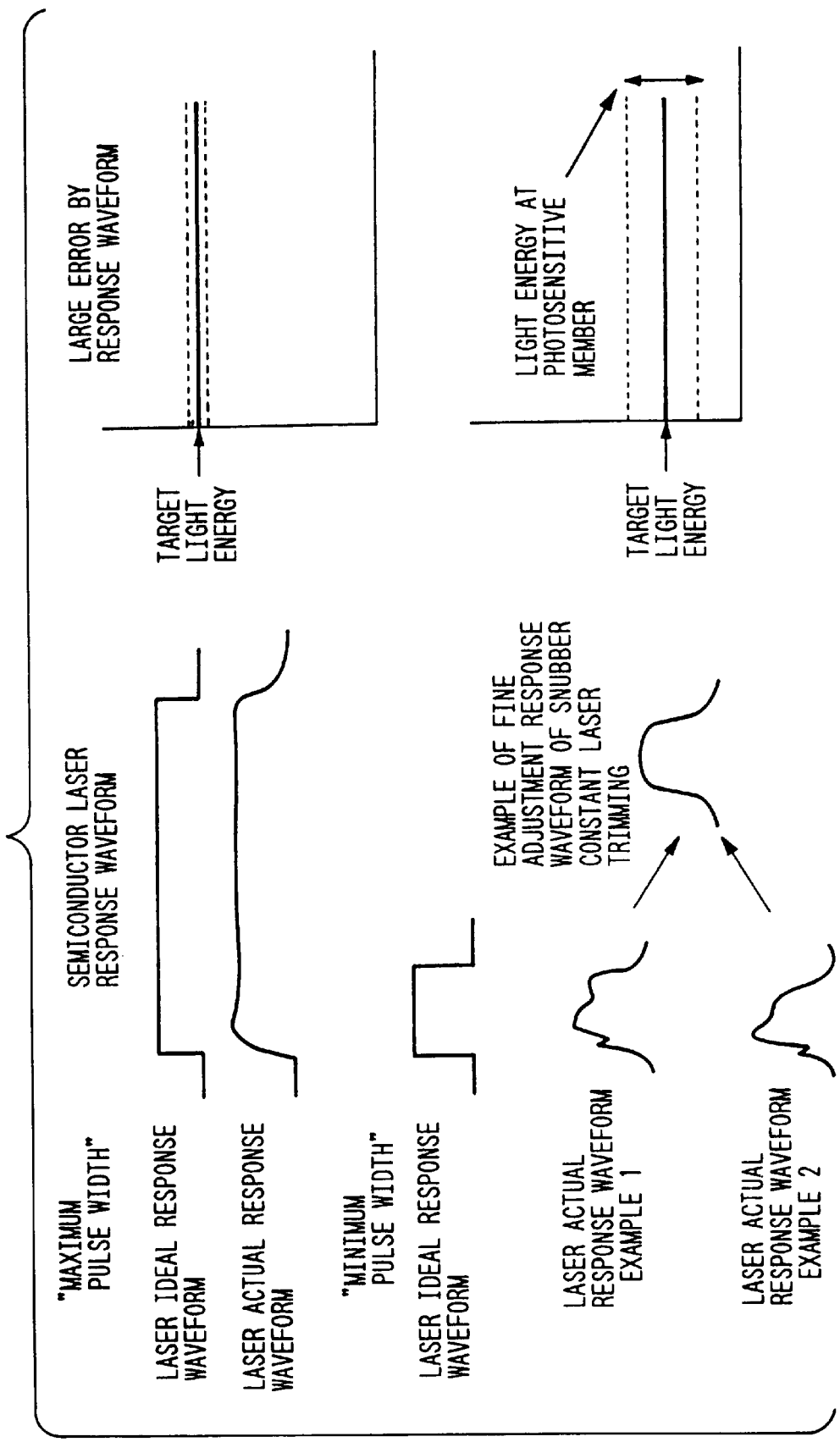
FIG. 20 shows a relation between the pulse width modulation signal, the semiconductor laser response waveform and the light energy on the photo-conductor, and FIG. 21, FIG. 22 which constitutes

In the circuit configuration as shown in FIG. 10, a series circuit of a resistor R4 and a capacitor C is connected in parallel across the laser LD including a power supply Vcc. A purpose of this circuit is to add a snubber circuit comprising the parallel circuit of the capacitor C and the resistor R4 to compensate a characteristic of the circuit because a transient characteristic of the laser light emission varies from laser unit to laser unit as shown be examples 1 and 2 of the laser response waveforms shown in FIG. 20.

By the addition of the above circuit, the transient characteristic is compensated to some extent but complete compensation is not attained when the constant is fixed. Further, in the mass production of the apparatus, some degree of variation should be permitted.

In the prior art binary printer, however, the above error may be permitted but when a light emission duration of a multi-value pulse width modulation laser is short, a predetermined light energy is not attained at the minimum pulse width data drive if correct compensation is not attained.

Thus, prior to the adjustment of the pulse width by the laser trimming for each laser unit 71, the resistor of the snubber circuit is cut by the laser trimming to adjust the transient response characteristic of the laser light emission for each unit as it is in the first embodiment.

Figure 11:
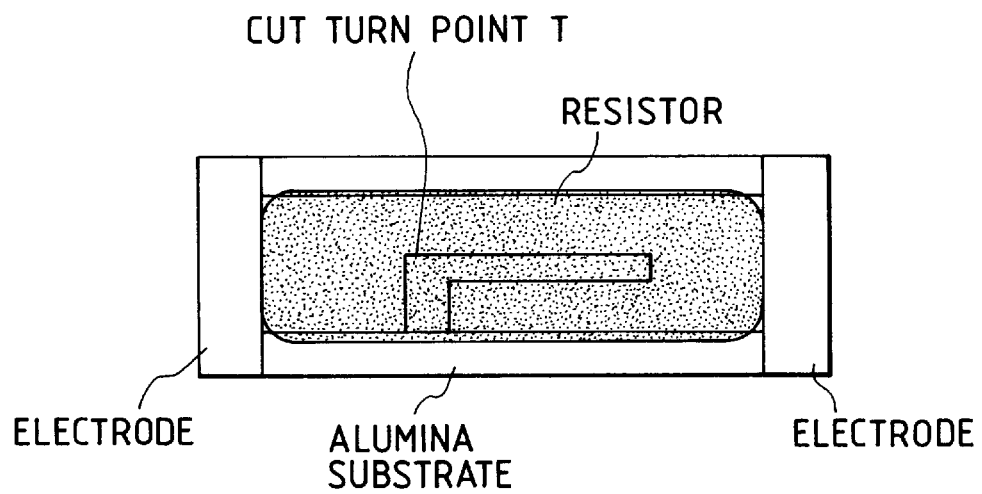
FIG. 11 shows L-cut trimming.
Figure 12:
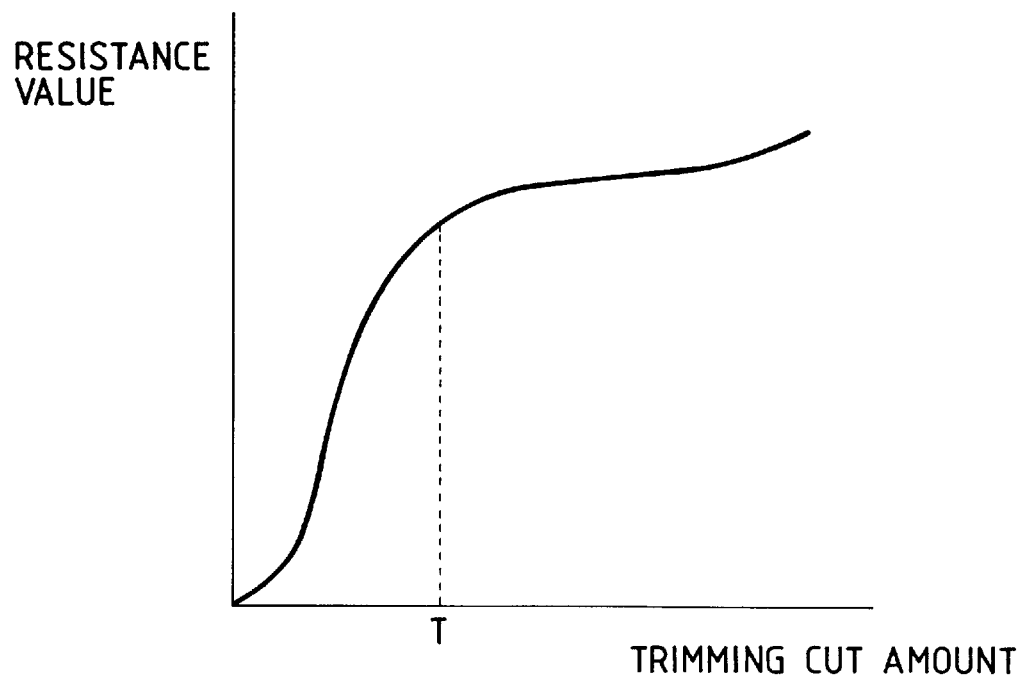
FIG. 12 shows a characteristic chart of a L-cut trimmed trimmable resistor.

As shown in FIG. 11, a method for trimming a trimmable resistor or thick film resistor by L-shape cut with "T" being a turn point of the cut to change the variation width of the resistor by the cut amount has been known. In the present embodiment, the cut point of the trimming is defined at least one arbitrary position and the cut direction of the resistor is set to a desired direction to attain a desired resistance value.

In accordance with the present embodiment, a total variation of the laser light emission transmission due to the laser operation resistance rs and the affect of a pattern between the modulation circuit and the laser device is compensated.

Further, since the snubber constant of the laser drive circuit may be combination-adjusted optimally for each laser device of the laser unit, a characteristic which is close to a theoretical response waveform is attained even if the drive pulse width of the laser is narrowed by the pulse width modulation and the excellent reproduction of the multi-value image is attained.

In the present embodiment, the series circuit of the resistor R and the capacitor C is connected in parallel to the semiconductor laser device as the snubber circuit although the snubber circuit per se is not limited to the specific configuration.

Third Embodiment

A third embodiment of the present invention is now explained.

Figure 13:
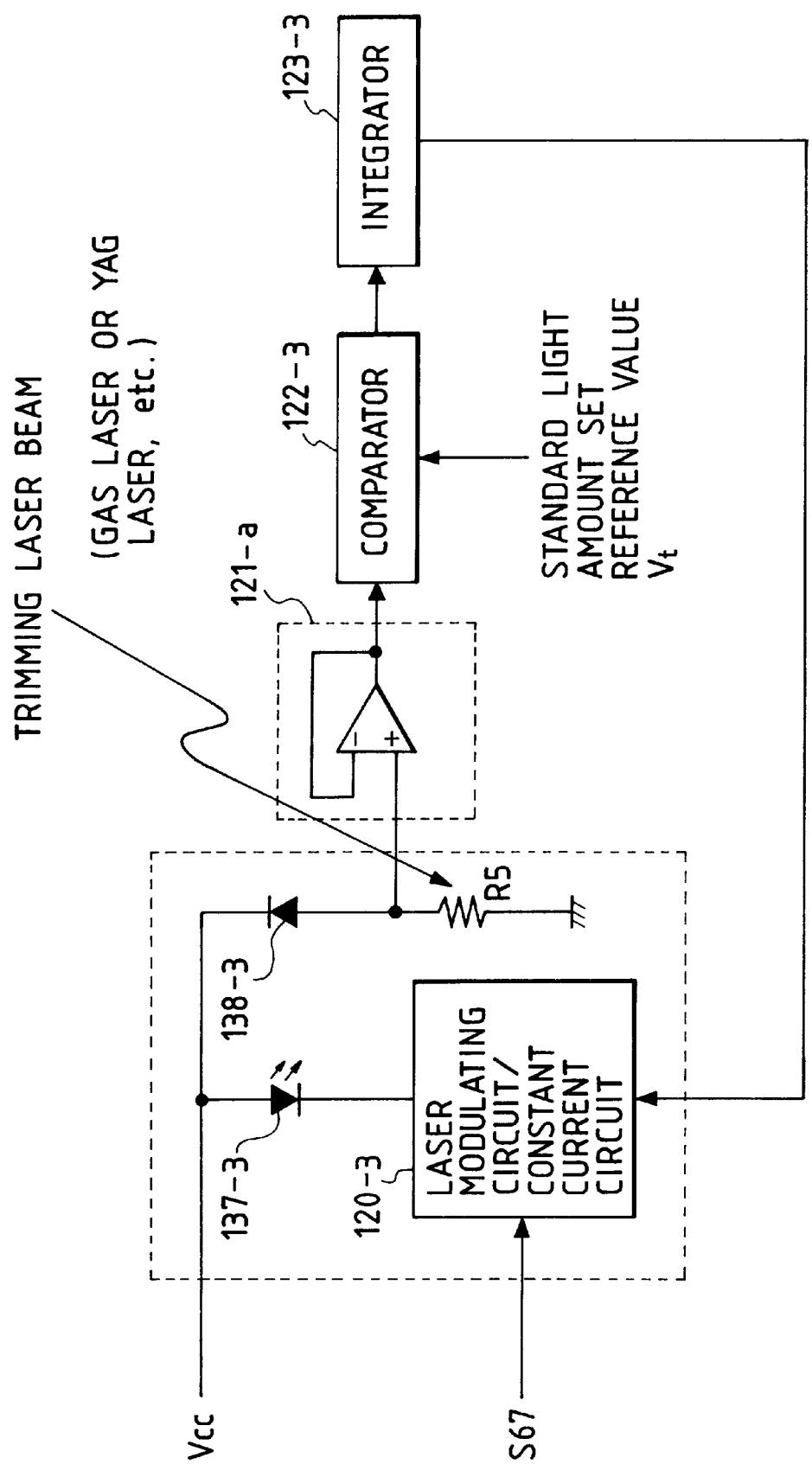
FIG. 13 shows a block diagram of APC negative feedback amplification factor adjustment in a third embodiment of the present invention.

FIG. 13 shows a block diagram of a configuration of an APC control negative feedback loop in the third embodiment of the present invention. A laser modulation circuit/constant current circuit 120-3 shown in FIG. 13 is of the same configuration as that of the laser drive circuit of the second embodiment shown in FIG. 10, that is, comprises a buffer 101-2, transistors Q102 and Q103 and a constant current circuit 104-2. A resistor R5 converts a current of a monitor photodiode 138-3 of laser light emission to a voltage.

A buffer circuit 121-a comprises an operational amplifier and functions as a buffer for the converted voltage. A comparator 122-3 in a succeeding stage to the buffer circuit 121-a compares an output of the buffer with a standard light intensity setting reference Vt. An integrator 123-3 converts an error of the compare result to a DC value and feeds it back to the laser modulation circuit/constant current circuit 120-3 to change the current flowing through the laser 137-3.

In accordance with the adjustment process of the first embodiment, the resistor R5 of FIG. 13 is a potentiometer and the laser unit 71 is connected to the laser barrel 73 in the apparatus shown in FIG. 7 and the light emission power (front beam) of the semiconductor laser is monitored by the optical power meter 74 and the amplification factor of the detection value (back beam) by the monitor photodiode 138 of the laser light emission is changed such that the light emission power matches to the standard setting power to adjust the loop gain of the APC negative feedback system.

Figure 15:
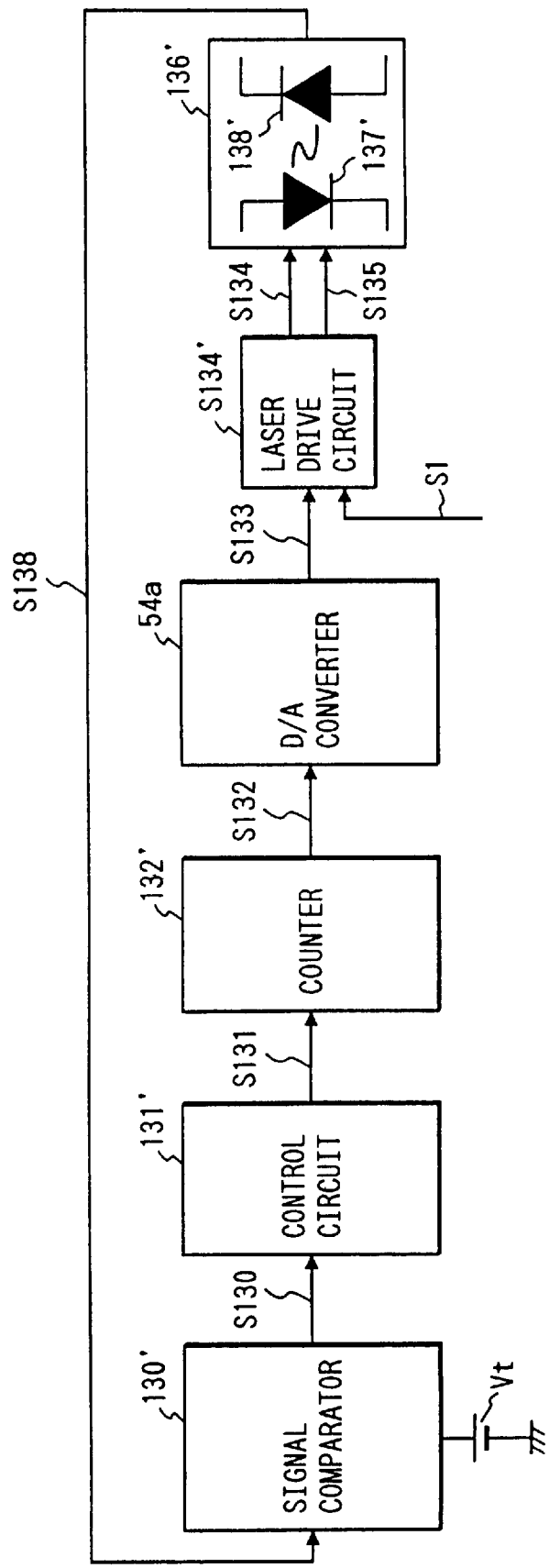
FIG. 15 shows a feedback control loop in a prior art light intensity control (APC)
Figure 16:
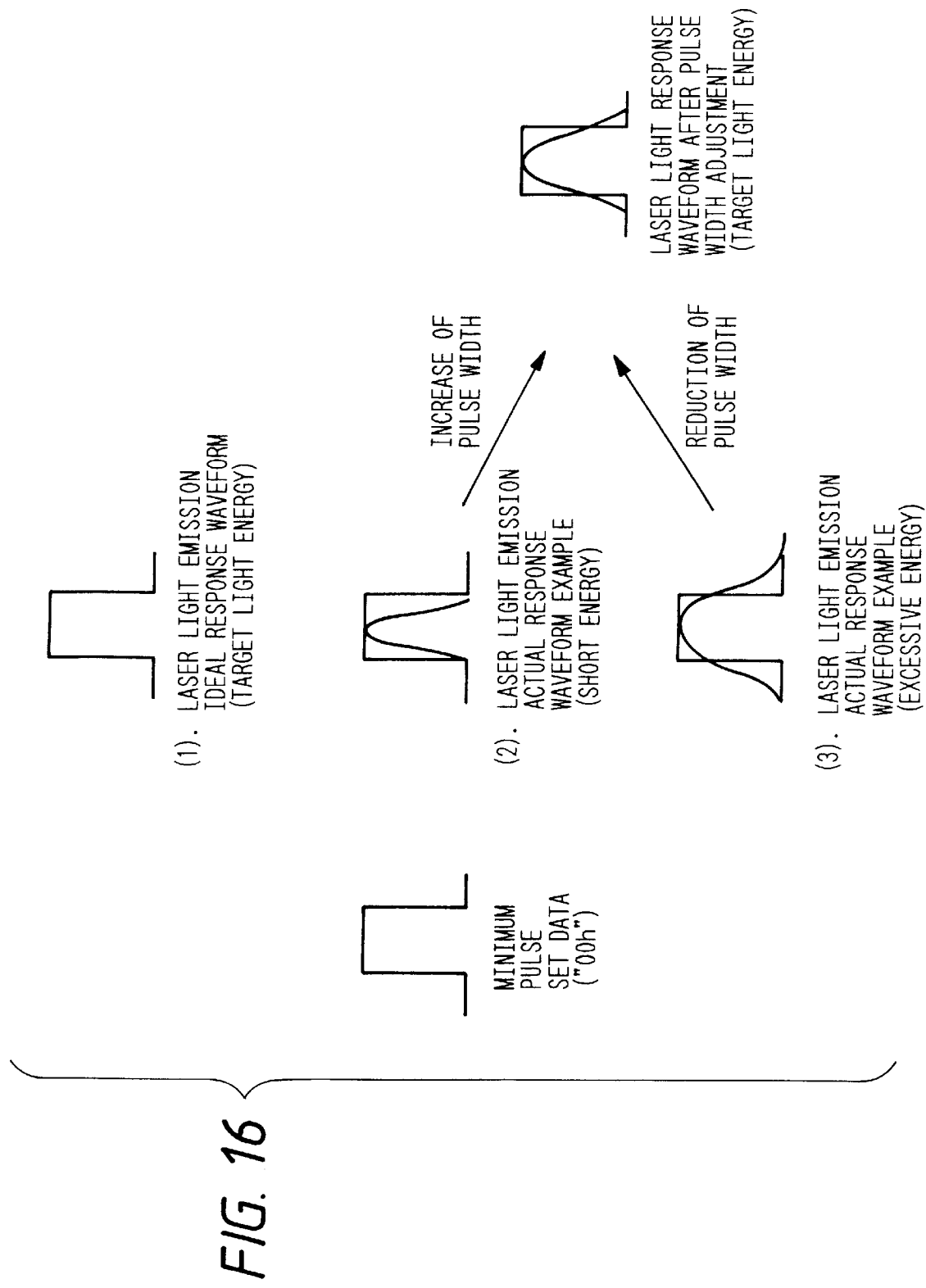
FIG. 16 shows a relation between pulse width adjustment and photo-conductor surface energy.

Accordingly, for the unit having the loop gain of the APC negative feedback system adjusted in the manner described above, the multi-value pulse width adjustment by the laser trimming is conducted while the light emission power of the laser unit is stabilized by the APC control operation as shown in FIG. 15 in the "presetting" process of the first embodiment as shown in FIGS. 8A to 9.

However, the loop gain adjustment of the negative feedback system for the APC in the present embodiment differs from the prior art method only in the adjustment position and the reference light power level detected by the optical power meter 74 and it may be implemented by the same configuration and jig as those of the multi-value pulse width adjustment by the laser trimming.

In the present embodiment, the current-voltage conversion unit comprising the potentiometer in FIG. 13 is a trimmable resistor or thick film resistor and the loop gain of the APC negative feedback system is adjusted by the trimming and then the same process as that of the first embodiment is conducted.

Figure 14:
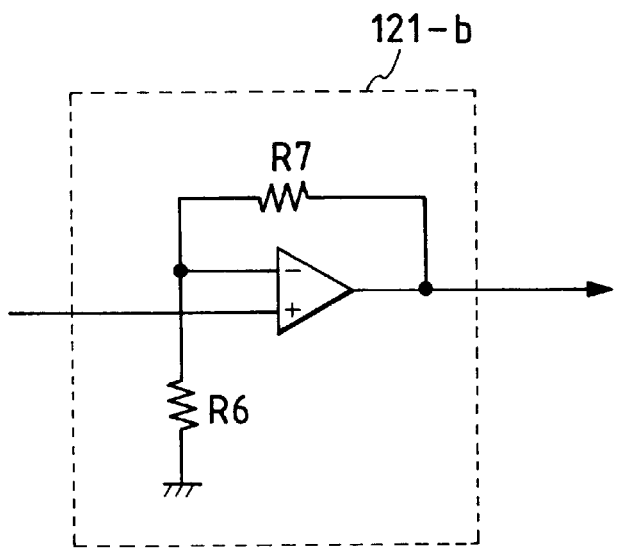
FIG. 14 shows a modification of a current-voltage conversion unit shown in FIG. 13.
Figure 17:
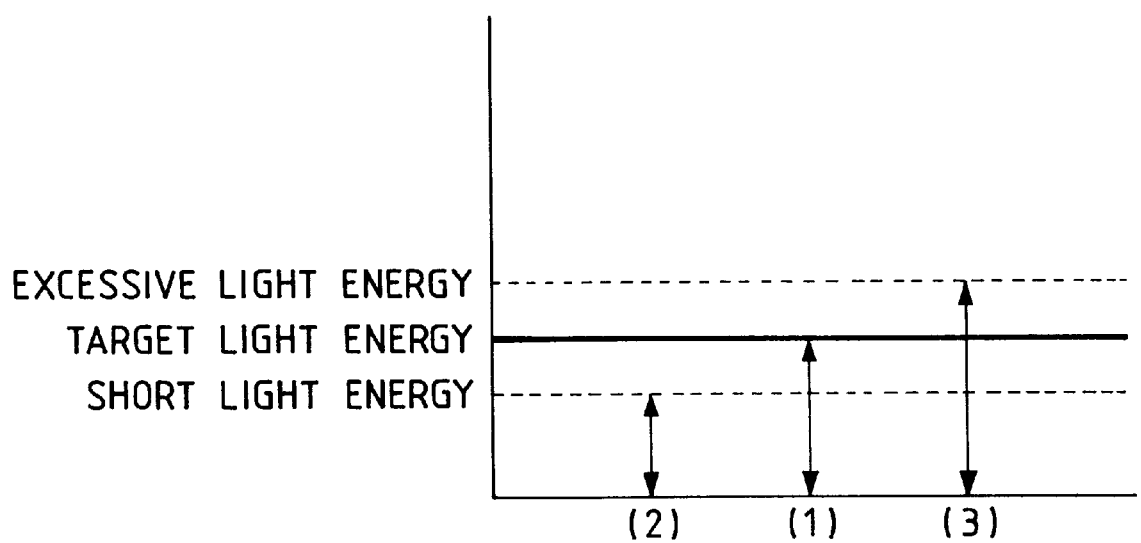
FIG. 17 shows a relation between the pulse width adjustment and the photo-conductor surface energy.

In FIG. 13, the current-voltage conversion unit comprises the resistor R5 although it is not restrictive. For example, the buffer circuit 121-a may be configured as shown in FIG. 14 and the loop gain of the APC negative feedback system may be adjusted by the trimming of the resistor R6 or R7.

In the present invention, the cutting method of the resistance by the laser trimming in the first to third embodiments is not restrictive.

The present invention may be applied to either a system comprising a plurality of apparatus or a system comprising a single apparatus. The present invention may also be implemented applying a program to the system or the apparatus.

In accordance with the present invention, the variation compensation adjustment of the semiconductor laser device may be precisely conducted in a short time and the automation of the adjustment and the prevention of the change of the adjusted portion after the adjustment are attained.

Further, since the adjustment as the laser unit is completed, the adjustment by a service man is not necessary even if the replacement of a fault part on site is needed and the maintenance of the apparatus is facilitated.

Fourth Embodiment

The present embodiment is partially similar to the first embodiment and the portions which are not described in detail are similar to those of the first embodiment.

Figure 21:
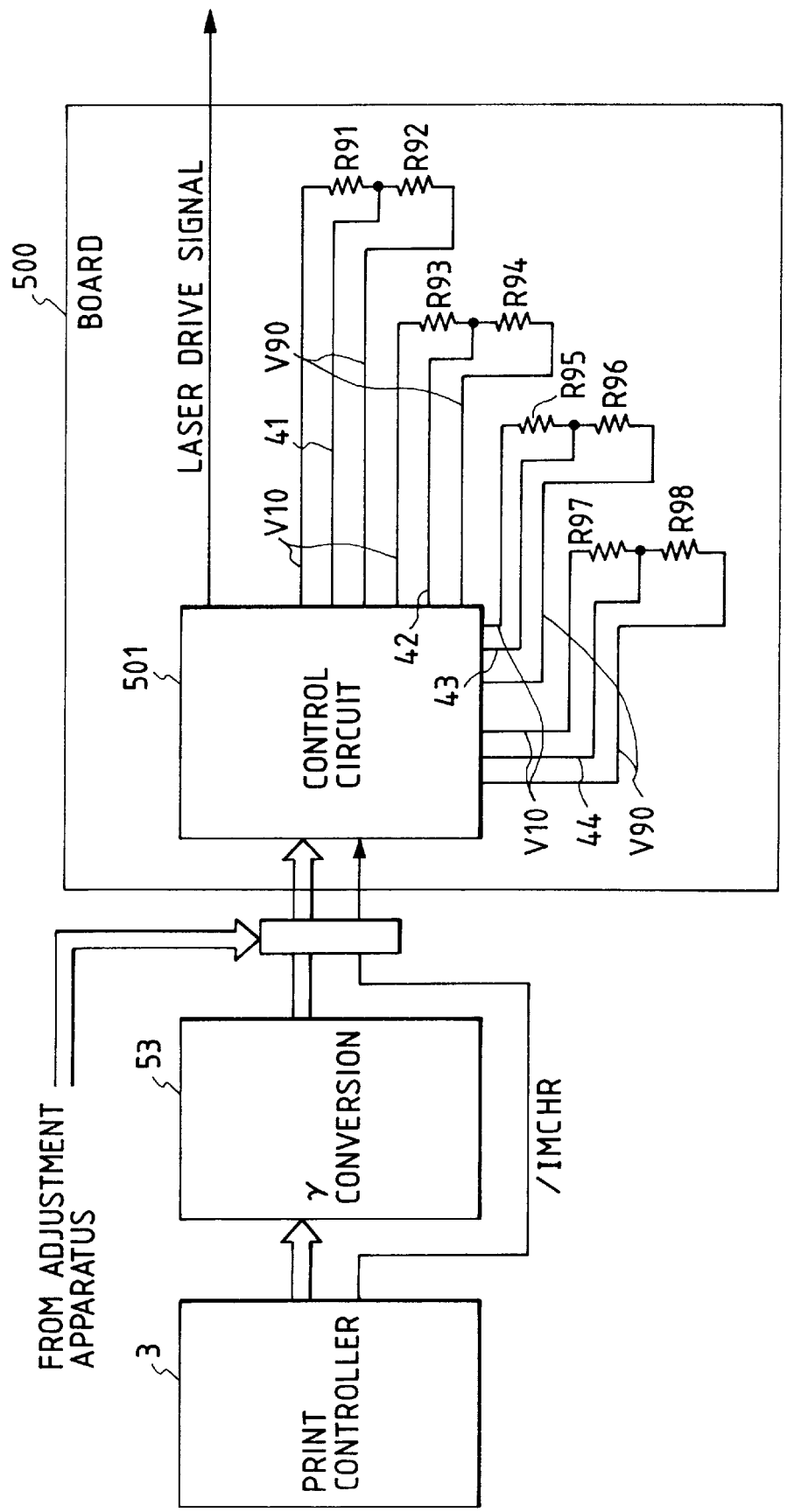

FIG. 21 shows a configuration around a board 500 corresponding to a pulse width modulation signal generation unit (FIG. 7) in the present embodiment.

A printer controller 3 and a gamma conversion circuit 53 are identical to those of the first embodiment and the explanation thereof is omitted.

In a normal recording operation, a digital image signal from the printer controller 3 is gamma-converted and supplied to the board 500, but when the board 500 is to be adjusted, a signal from the pulse width modulation signal generation unit (adjusting apparatus) shown in FIG. 7 is applied to the control circuit 501 of the board 500. The adjustment may be conducted while the board 500 is removed from the recording apparatus or while it is mounted.

Figures 22, 22A:
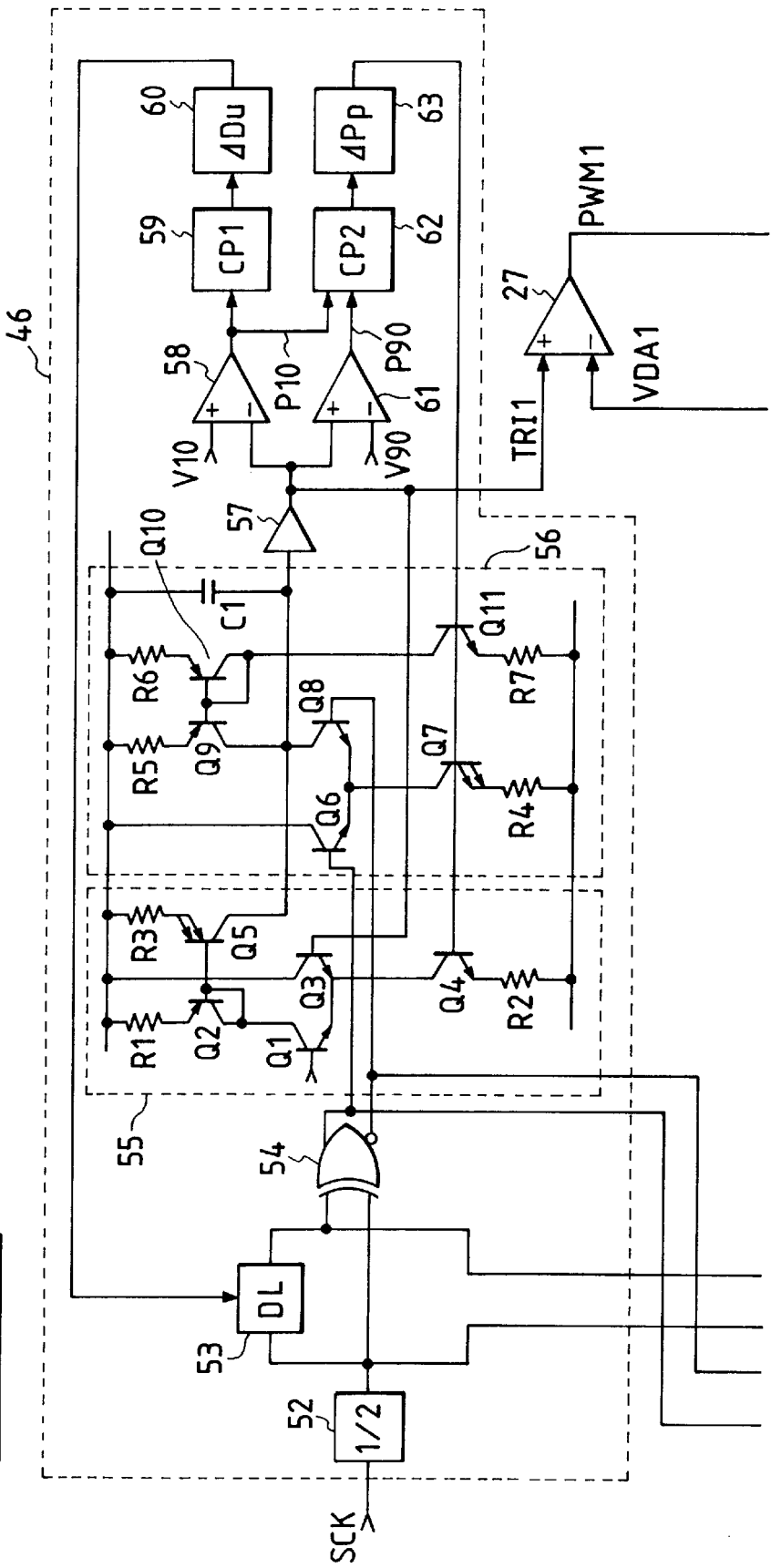
Figure 22B:
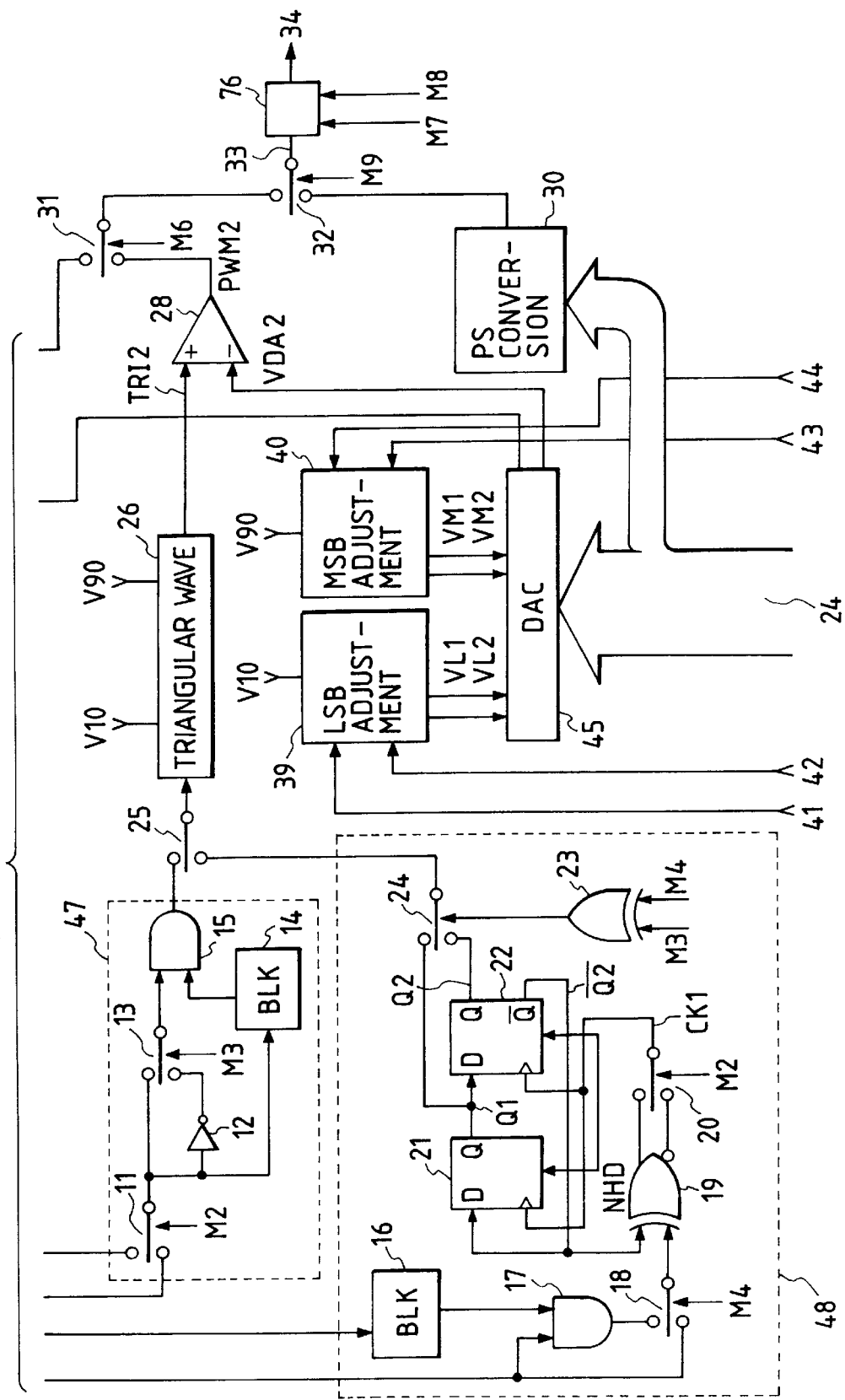

The control circuit 501 may comprises an IC and has a configuration as shown in FIGS. 22A and 22B.

Voltages V10 and V90 to be described later are outputted from four terminals to the control circuit 501, and resistors R91 to R98 which are trimmable by the laser beam divide the voltages V10 and V90 as shown. By trimming the resistors, the voltage division is set. The four voltage divided levels are supplied to terminals 41 to 44 of the control circuit 501.

In FIGS. 22A and 22B, a video clock (VCLK of FIG. 1), that is, a synchronization clock signal SCK at which a clock signal drops for synchronization at a horizontal synchronization signal timing and a phase jumps is applied to a terminal 1. Since a duty factor of the input clock signal is not assured, it is necessary to reproduce the duty factor of the clock signal.

The clock signal SCK applied to the terminal 1 is supplied to a first ramp wave generation circuit 46 which generates a clock signal having duty factor thereof reproduced to 50% as will be described later and outputs a ramp wave signal TRI1 of duty factor 50% having a rising slope in a HI section thereof and a falling slope in a LO section.

A second ramp wave generation circuit 26 outputs a ramp wave signal of a duty factor 50% having a rising slope in HI section of an input clock signal (an output of a switch 25) and a falling slope in a LO section.

The output TRI1 of the first ramp wave generation circuit 46 and the output TRI2 of the second ramp wave signal generation circuit 26 are controlled to have duty factors of 50%, respectively, and the ramp wave levels and the DC offsets to the nominal values to be described later.

TRI1 is applied to a positive input terminal of a comparator 27, and TRI2 is applied to a positive input terminal of a comparator 28. A first output VDA1 and a second output VDA2 of a DA converter (hereinafter referred to as DAC) are applied to negative inputs of the comparators 27 and 28.

An LSB level of VDA1 of the DAC 45 is determined by a first output VL1 of an LSB adjustment circuit 39 which is controlled by an adjustment terminal 41 of an LSB adjustment circuit 39, and an LSB level of VDA2 is determined by a second output VL2 of the LSB adjustment circuit 39 which is controlled by an LSB adjustment terminal 42. VL1 and VL2 are correlated to the DC offset level and the signal level of the ramp wave signals TRI1 and TRI2, and the LSB level of the DAC 45 does not change with respect to the ramp wave signal even if an environment change such as a power supply change or a temperature change is included.

An MSB level of VDA1 of the DAC 45 is determined by a first output VM1 of an MSB adjustment circuit 40 which is controlled by an adjustment terminal 43 of an MSB adjustment circuit 40, and an MSB level of VDA2 is determined by a second output VM2 of the MSB adjustment circuit 40 which is controlled by an MSB adjustment terminal 44. VM1 and VM2 are correlated to the DC offset and the signal level of the ramp wave signals TRI1 and TRI2, respectively, as are VL1 and VL2, so that the MSB level of the DAC 45 does not change with respect to the ramp wave signal even if the environmental change such as a power supply change or a temperature change is included.

The DAC 45 outputs a level corresponding to input 8-bit image data (D1 to D8) to the negative terminals of the comparators 27 and 28.

The comparators 27 and 28 output PWM signals PWM1 and PWM2 centered at an apex of the ramp wave signal in accordance with the adjustment condition of the DAC 45 and the image data value. PWM1 and PWM2 are connected to input terminals of SW 31 which is controlled by a mode signal M6 to output PWM1 when M6=0 and PWM2 when M6=1.

An output PWM of SW 31 is applied to one input terminal of SW 32. An output PS of a serial-parallel conversion circuit (hereinafter referred to as PS conversion circuit) is applied to the other input terminal of SW 32.

The PS conversion circuit 30 receives parallel input data of low order four bits (D1 to D4) of the image data and converts them to a clock signal. SW 32 is controlled by a mode signal M9 to output PWM when M9=0 and PS when M9=1, to a terminal 33.

An operation of the ramp wave generation circuit 46 is explained in detail.

The input clock signal SCK whose duty factor is broken (the duty factor 50% is not assured) is frequency divided by a frequency divider 52. The frequency divided clock signal is applied to a variable pulse delay circuit 53 which outputs a delayed clock signal. The delayed clock signal is applied to an exclusive OR gate circuit 54 together with the non-delayed clock signal SCK.

Assuming that a delay time of the variable pulse delay circuit 53 is set to one half of the period of the input clock signal SCK, the exclusive OR gate circuit 54 outputs a reproduced clock signal of duty factor 50% (having the same period as that of SCK).

This clock signal is applied to a ramp wave signal generation unit 56. It is assumed that Q6=Q8, 2·Q11=Q7, Q9=Q10, 2·R4=R7 and R5=R6 where a symbol=for the transistor indicates that emitter sizes are equal. In this case, charging and discharging currents flowing through a capacitor C1 are equal and the charging and the discharging are switched by Q8 to generate the ramp wave signal.

The ramp wave signal is applied to comparator amplifiers 58 and 61 through a buffer 57. The comparator amplifier 58 receives the ramp wave signal at an inverting phase input and a voltage V10 defining a 10% level from a top apex of a desired ramp wave signal at an in-phase input as shown in FIG. 23A.

Assuming that a peak value and an offset value of the ramp wave signal are at the nominal values, the comparator 58 outputs a 10% negative pulse as shown in FIG. 23C. On the other hand, the comparator amplifier 61 receives the ramp wave signal at an in-phase input and a voltage V90 defining a 10% level from a bottom apex of a desired ramp wave signal at a reverse phase input.

As described above, when the ramp wave signal is at the nominal value, the 10% negative pulse and the 90% negative pulse are outputted from the comparator amplifiers 58 and 61. The two pulses are applied to a charge pump circuit 62 shown in FIG. 24. Assuming that 5·Q29=9·Q33, Q33=Q32=Q36, Q31=Q37, 9·R15=5·R18, R16=R17=R19, a current flowing through Q33 is 1.8 times a current flowing through Q34 and Q37 when they are turned on.

Thus, only when a sum of L level periods of the output pulses P10 and P90 of the comparators 58 and 61 is 20% of the ramp wave signal period, a sum of the charging current and the discharging current of the capacitor C4 (see FIG. 24) balances and the output voltage of the charge pump circuit 62 is stable. Since the ramp wave signal generated by the ramp wave generation circuit 56 is generated only by the charging current to the capacitor C1, the ramp wave slope is linear and the peak value of the ramp wave signal is at the desired nominal value under the balanced condition of the charge pump circuit 62.

The output of the charge pump circuit 62 is converted to a peak error signal by a peak error generation circuit 63 to control the charging and discharging currents of the ramp wave signal generation unit 56. For example, when the peak value of the ramp wave signal is large than the nominal value, the output voltage of the charge pump circuit 62 rises to drop the output voltage of the peak error generation circuit 63 and reduce the peak level of the ramp wave signal. On the other hand, when the peak value of the ramp wave signal is small, the output voltage of the charge pump circuit 62 drops to raise the voltage of the peak error signal and increase the peak level of the ramp wave signal to converge it to the nominal value.

Figure 25:
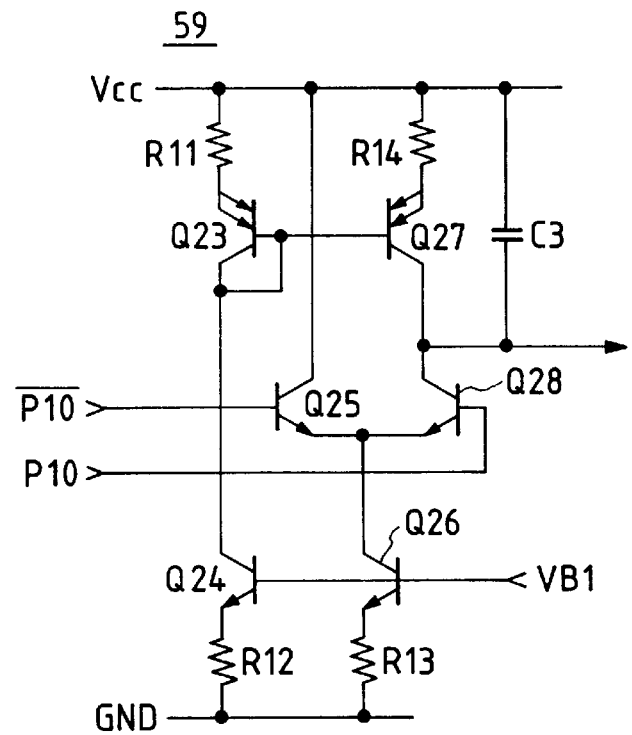

On the other hand, the output of the comparator amplifier 58 is applied to the charge pump circuit 59 shown in FIG. 25. When Q24=Q26, 9·Q23=10·Q27, R12=R13 and 10·R11=9·R14 are met, mean values of the charging currents and the discharging currents of the capacitor C3 are equal only when the L level period of the pulse P10 is 10% of the ramp wave signal period and the output voltage of the charge pump circuit 59 is balanced.

If the duty cycle of the clock signal applied to the ramp wave signal generation unit 56 is broken, the offset voltage of the ramp wave signal is not stable because the charging current and the discharging current of the capacitor C1 for generating the ramp wave signal are equal, and the charge pump circuit 59 is not balanced.

The output of the charge pump circuit 59 is applied to the offset error generation circuit 60 which generates an offset error signal which is then applied to the variable pulse delay circuit to vary the pulse delay time to control the clock duty. The control of the clock duty regulates the offset voltage of the ramp wave signal.

A start circuit 55 serves to fix an output voltage of the ramp wave signal generation unit 56 to the bottom apex voltage (a base input of Q1) of the ramp wave signal of V100 shown in FIG. 7 in the clock drop period. Q4=Q11, Q5>2·Q2, R1>2·R3.

In the clock drop period, Q8 is turned on and the capacitor C1 is continuously charged. When it is lower than V100, a discharge current is supplied from Q5 to the capacitor C1 to stop the charging of C1 at V100 and the next input clock signal is waited.

A second ramp wave signal generation circuit 26 shown in FIG. 22B may be basically of the same configuration as that of the ramp wave generation circuit 46 (particularly 55 to 63) for modulating the unit pixel. However, in the offset value control of the ramp wave signal, the clock duty of the input clock signal is secured (frequency divided clock). Thus, in the present embodiment, the output of the offset error voltage generation circuit 60 is converted to an error voltage by using a voltage-current converter, not shown and it is added to the output of the ramp wave signal generation unit to control the balance of the charging and discharging current balance of the ramp wave signal generating capacitor to control the offset value of the ramp wave signal.

By the present system, the number of control loops in the second ramp wave signal generation circuit 26 may be suppressed to two and jitters of the phase, peak and offset due to the loop error may be minimized.

Figure 26:
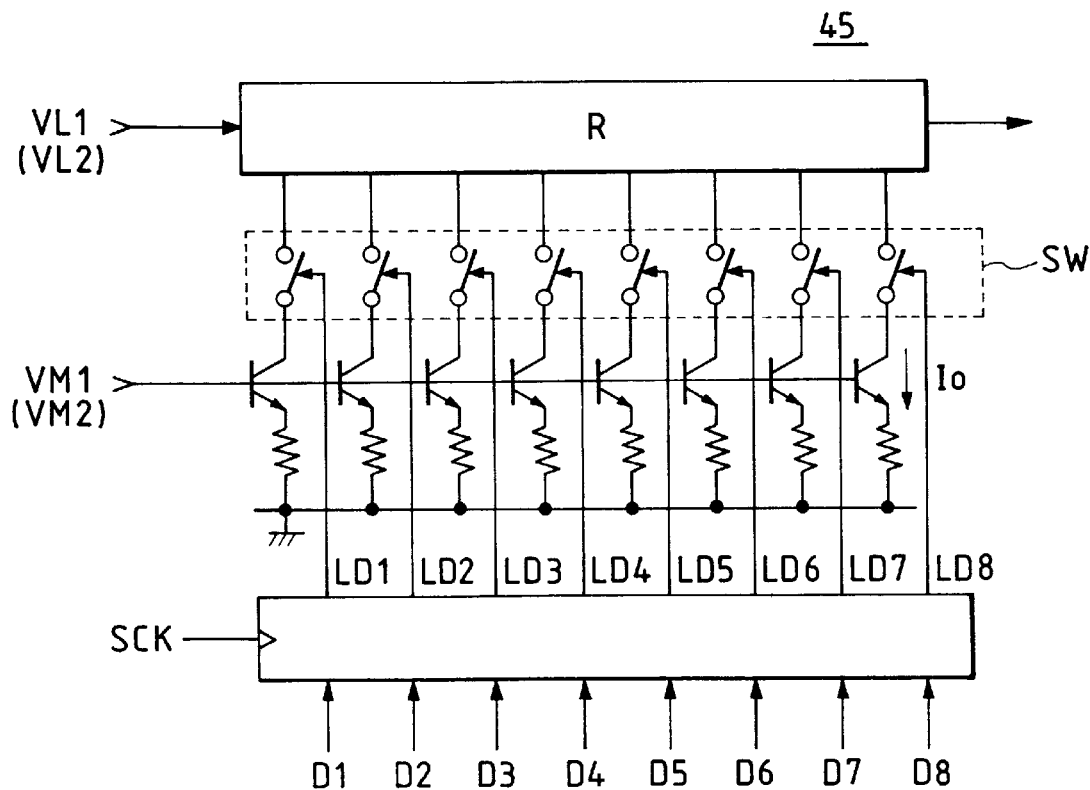

FIG. 26 shows a configuration of the DAC 45. While only a system for the first output VDA1 is shown in FIG. 26, a system for the second output VDA2 is of the same configuration. In FIG. 26, VL1 denotes an output of the LSB adjustment circuit 39 and VM1 denotes an output of the MSB adjustment circuit 40.

Image data D1 to D8 are latched by a rising edge of the clock signal CSK, and the latch output LDn is applied to a control terminal of the current switch SW so that SW is turned on when LDn is H1. A current flowing through SW is determined by VM1 and an output VDA1 of the DAC 45 is set to VDA1=VL1 when D1 to D8=0
VDA1=VL1−R·$I_0$ when D1 to D8=1 where $I_0$ is the set current flowing through SW.

The LSB adjustment circuit 39 and the MSB adjustment circuit 40 are now explained. The LSB adjustment circuit 39 and the MSB adjustment circuit 40 adjusts such that the DAC 18 outputs V0 to V10 shown in FIG. 7, where V(VLB)>V(MSB).

V0 is at the DC level of the ramp wave signal and V100 is at the bottom apex level of the ramp wave signal. The ramp wave signal and the DC offset thereof are set with respect to the DC levels of V10 and V90 as described in connection with the ramp wave generation circuit.

Accordingly, by generating the output of the DAC 45 by the function of V10 or V90, or both of them, a change of the signal level of the ramp wave signal or the DC offset may be tracked even if it changes as an environment changes.

Figure 27:
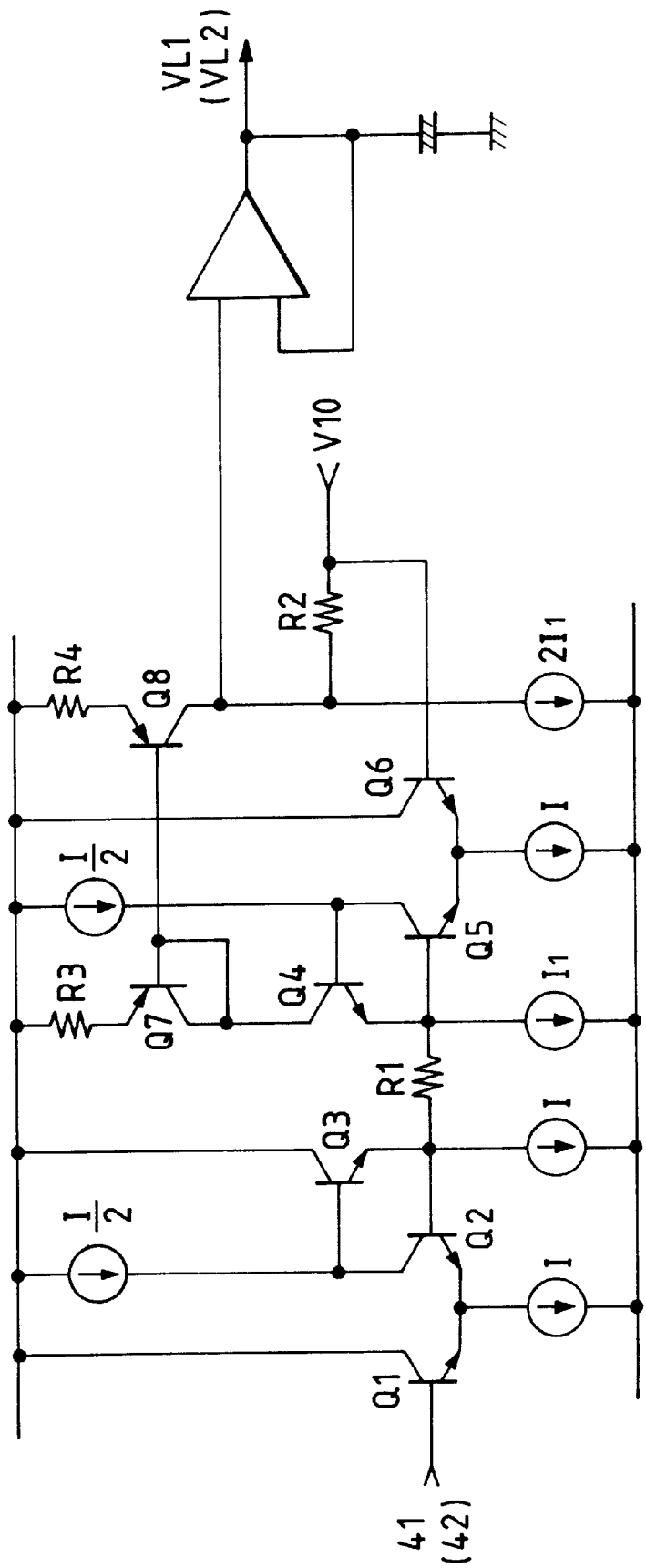

An example of the LSB adjustment circuit 39 is shown in FIG. 27. When a voltage $$Val(=n·V10+(1-n)·V90)(0 \leq n \leq 1)$$

correlated to V10 and V90 is applied to an adjustment terminal 41, $$V(Q8/C)=V10+R2(((1-n)·(V10-V90)/R1)-I1)$$

appears at Q8/C, where/C represents a collector.

Accordingly, by using the same function as that of V10 and V90 for (I1·R2), V(Q8/C) may be adjusted without regard to the power supply voltage VCC and the temperature and it may be kept stable thereafter.

For example, in order to set the adjustment range of the LSB level to V0-V30,

R2·I1=V10−V30=ΔV20
(V10−V90)·R2/R1=V0−V30=ΔV30
 where ΔV20: a level corresponding to 20% when the ramp wave level is 100% may be set, and the LSB level may be adjusted to
 V30 when terminal 41 voltage is V10, and
 V0 when terminal 41 voltage is V90
in accordance with the terminal 41 voltage (V10−V90).

Figure 28:
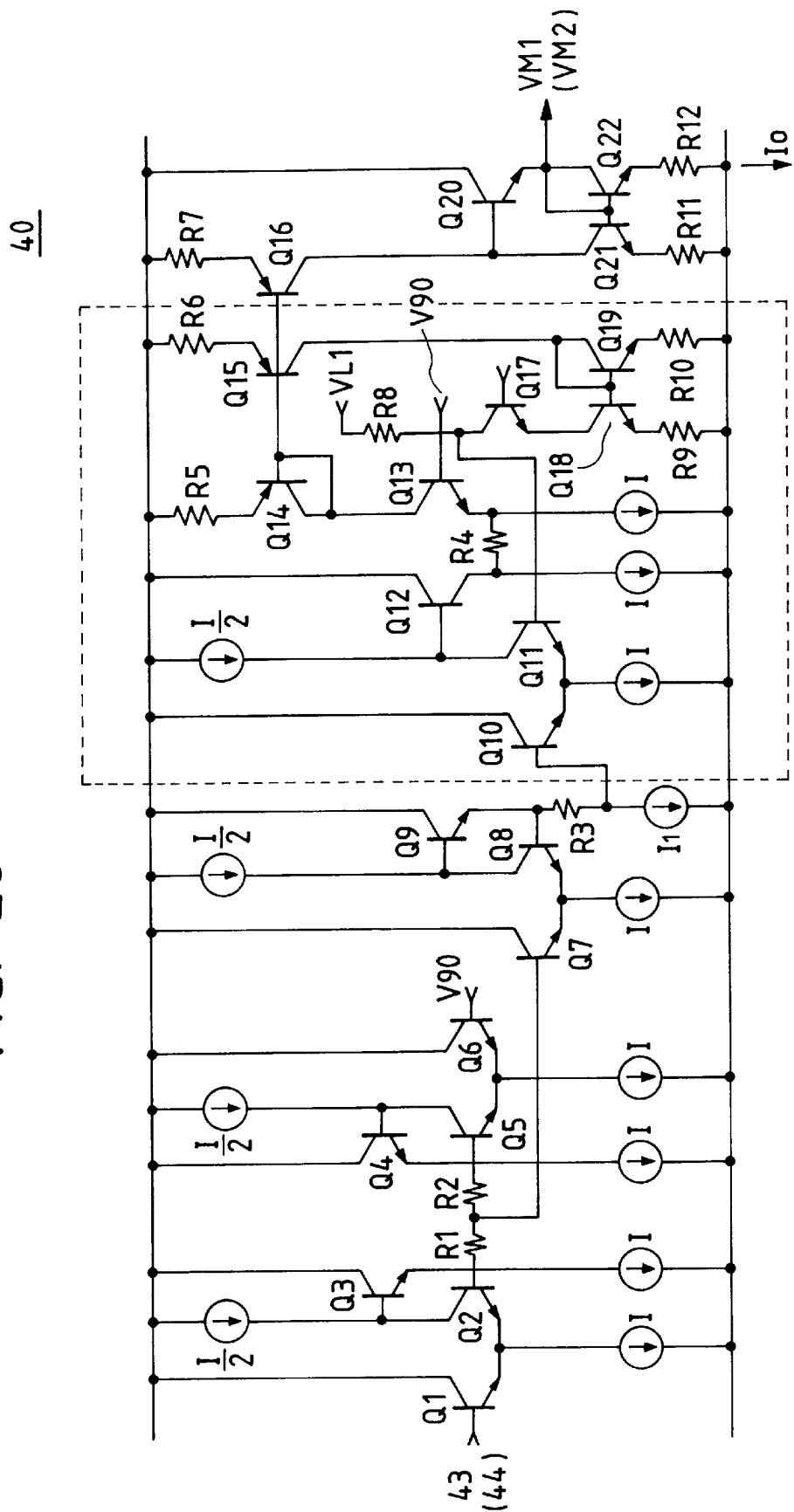

An example of the LSB adjustment circuit 40 is shown in FIG. 28.

$$Vam(=m·V10+(1-m)·V90)(0 \leq m \leq 1)$$

having the same voltage range as that of the LSB adjustment terminal Val is applied to the adjustment terminal 43. A Q7/B voltage is given by $$V(Q7/B)=V90+m(V10-V90)·R2/(R1+R2)$$

and a voltage Q10/B is given by $$V(Q10/B)=V(Q7/B)-R3·I1$$

By setting (R3·I1) to the same function as that of V10 and V90, the V(Q10/B) voltage is correlated to the ramp wave bias without regard to the power supply VCC and the temperature.

A block circles by broken lines in FIG. 11 from a feedback amplifier which applies feedback such that Q11/B is at the same potential as Q10/B. The voltage of VL1 less a voltage drop (R8·I2) by an output current I2 of Q13 and a resistor R8 is applied to Q11/B.

When R8, I2 are set to R and $I_0$ in FIG. 9, the Q11/B voltage is the MSB level of the DAC 45. Accordingly, the feedback amplifier outputs to Q16/C a current to render the MSB level of the DAC 45 to the Q10/B potential. The current is converted to a bias of the DAC 45 to produce VM1 which is outputted to the DAC 45.

For example, in order to set the adjustment range of MSB to V70-V100, {(V10−V90)·R2/(R1+R2)} which represents a change width of Q7/B is set to V30 (=V70−V100).

R2/(R1+R2)=V30/V(10/90)=⅜
Since Q7/B=V90 when m=0, a level shift by R3 is set to
R3·I1=V100−V90=ΔV10
where ΔV10: 10% of the ramp wave level so that the MSB level may be set to
 V70 when terminal 43 voltage is V10, and V100 when terminal 43 voltage is V90 by the adjustment terminal voltage (V10−V90).

In the LBP system which conduct the PWM pixel modulation, it is desired to conduct the pixel modulation not only by unit pixel or changing the pixel unit to two times or three times but also by conducting flexible pixel modulation such as controlling the pixel modulation phase by sub-scan unit to attain a high grade print image.

Thus, a mode which permits exchanging the outputs of the exclusive OR circuit 54 and supply them to the transistors Q6 and Q8 may be provided. In this case, V0 level of the ramp wave is applied to Q1 of the circuit 55.

The double pixel modulation phase control circuit 47 and the triple pixel modulation phase control circuit 48 may change the phases of an input clock signal of the second ramp wave generation circuit 26 in accordance with the signals M2 to M4.

An output 33 is connected to a forced HL control circuit 76 and an output state is controlled by mode signals M7 and M8.

A signal appearing at the output 33 forcibly HL controls the pixel modulation signal output by the mode signals M7 (forced L) and M8 (forced H) without regard to the image data D1 to D9. Thus, when the print density is to be set to 0 or 100%, it is assured completely over a wide range without using the print image density which is set by the minimum and maximum pulse widths.

What is claimed is:

1. An adjusting apparatus for adjusting an objective apparatus, the objective apparatus having a light emitting device, an electrical resistance device comprising a trimmable resistor, and controlling means for controlling the light emitting device to emit a light in a period corresponding to a value of input data, said adjusting device comprising:

setting means for setting the controlling means of the objective apparatus in a predetermined enabling state in which the light emitting device successively emits a light in a period corresponding to a predetermined value;

detection means for detecting a light emission intensity of the light emitting device; and adjusting means for adjusting a resistance of the electrical resistance device by trimming the trimmable resistor in accordance with the light emission intensity of the light emitting device detected by said detecting means.

2. An adjusting apparatus according to claim 1, wherein said adjusting means trims the trimmable resistor by a laser beam.

3. An adjusting apparatus according to claim 1, wherein said controlling means of said objective apparatus controls a pulse width of a predetermined pulse width modulation signal to control the light emission period.

4. An adjusting apparatus according to claim 1, wherein said controlling means of said objective apparatus includes correction means for correcting a transient characteristic of light response of said light emitting device.

5. An adjusting apparatus according to claim 4, wherein said correction means is a snubber circuit including a trimmable resistor, and said adjusting means trims the trimmable resistor.

6. An adjusting apparatus according to claim 1, wherein said controlling means of said objective apparatus comprises feedback control means for maintaining said light emitting device in the predetermined activated state in a pre-stage of an adjustment of the electrical resistance device, and said adjusting means adjusts an amplification gain of the feedback control by adjusting the electrical resistance device.

7. An adjusting apparatus according to claim 1, wherein said objective apparatus is a recording apparatus.

8. An adjusting apparatus according to claim 7, wherein said controlling means of said objective apparatus includes means for generating a pulse width signal in response to a digital value representing a density level, and said adjusting means supplies a predetermined digital value to said control means and adjusts the resistance of said electrical resistance device in accordance with a comparison result of the light emission intensity of said light emitting device and a reference value.

9. An adjusting apparatus according to claim 8, wherein said electrical resistance device includes a trimmable resistor trimmable by a laser beam, and said adjusting means includes means for generating the laser beam for trimming said trimmable resistor.

10. An adjusting method for adjusting an objective apparatus, the objective apparatus having a light emitting device, an electrical resistance device comprising a trimmable resistor, and controlling means for controlling the light emitting device to emit a light in a period corresponding to a value of input data, said adjusting method comprising the steps of:

a setting step of setting the controlling means of the objective apparatus in a predetermined enabling state in which the light emitting device successively emits a light in a period corresponding to a predetermined value;

a detection step for detecting a light emission intensity of the light emitting device; and an adjusting step of adjusting a resistance of the electrical resistance device by trimming the trimmable resistor in accordance with the light emission intensity of the light emitting device detected in said detecting step.

11. An adjusting method according to claim 10, wherein said adjusting step trims the trimmable resistor by a laser beam.

12. An adjusting method according to claim 10, wherein said controlling step controls a pulse width of a predetermined pulse width modulation signal to control the light emission period.

13. An adjusting method according to claim 10, wherein said adjusting step includes a correction step for correcting a transient characteristic of light response of said light emitting device.

14. An adjusting method according to claim 13, wherein said objective apparatus includes means for controlling the light emission period of said light emitting device in accordance with a digital value, said controlling step includes a step for supplying a predetermined digital value to said controlling means, and said adjusting step adjusts the electrical resistance device to set the light emission period of said light emitting device corresponding to said predetermined digital value.

15. An apparatus for adjusting a recording apparatus, said recording apparatus including a light source and control means including a trimmable resistance device for driving the light source for a time corresponding to a digital value representing a density level, said apparatus comprising:

detecting means for detecting a light from the light source at a relative position at which a member to be illuminated of the recording apparatus is to be positioned;

setting means for setting the control means of the recording apparatus in a predetermined enabling state in which the light source successively emits a light in a period corresponding to the predetermined digital value; and adjusting means for adjusting a resistance of the trimmable resistance device provided in said control means periodically for a time determined by said predetermined digital value in accordance with an output of said detecting means in an activated state of said light source.

16. An apparatus according to claim 15, wherein said trimmable resistance device is trimmable by a laser beam, and said adjusting means includes laser beam generation means for trimming said trimmable resistance device.

17. An apparatus according to claim 15, wherein said supplying means supplies two predetermined digital values, and said adjusting means adjusts resistances of different trimmable resistance devices in accordance with the two predetermined digital values.

18. An apparatus according to claim 15, wherein said control means has first and second modes, said apparatus includes means for setting a mode of said control means, and said adjusting means adjusts resistances of different trimmable resistance devices in accordance with the mode.

19. An apparatus according to claim 18, wherein said first and second modes have different light emission times and light emission intervals for given digital values.

20. A method for adjusting a recording apparatus, said recording apparatus including a light source and control means including a trimmable resistance device for driving the light source for a time corresponding to a digital value representing a density level, said method comprising the steps of:

a setting step of setting the control means of the recording apparatus in a predetermined enabling state in which the light source successively emits a light in a period corresponding to the predetermined digital value;

a detecting step of detecting a light from the light source at a position at which a member to be illuminated of the recording apparatus is to be positioned while said light source is driven periodically for a time corresponding to said predetermined digital value; and an adjusting step of adjusting a resistance of the trimmable resistance device provided in said control means periodically for a time determined by said predetermined digital value in accordance with detection in said detecting step.

21. A method according to claim 20, wherein said trimmable resistance device is trimmable by a laser beam, and said adjusting step generates a laser beam for trimming said trimmable resistance device.

22. A method according to claim 20, wherein said supplying step supplies two predetermined digital values and said adjusting step adjusts resistances of different trimmable resistance devices in accordance with the two predetermined digital values.

23. A method according to claim 20, wherein said control means has first and second modes, said method further comprises a step for setting a mode of said control means, and said adjusting step adjusts resistances of different trimmable resistance devices in accordance with the mode.

24. A method according to claim 23, wherein said first and second modes have different light emission times and light emission intervals for given digital values.

25. A recording apparatus having a light source, said recording apparatus comprising:

detection means for detecting an intensity of the light emitted by the light source;

first control means for controlling the intensity of the light emitted by the light source in accordance with the light intensity detected by said detection means;

second control means for causing said light source to emit a light for a light emission time determined by a digital value; and a trimmable resistance device trimmable by a laser beam, wherein the light emission time of said light source is dependent upon a resistance of said trimmable resistance device.

26. A recording apparatus according to claim 25, wherein said second control means includes means for generating a pulse signal of a width corresponding to the digital value.

27. A recording apparatus according to claim 25, wherein said second control means inputs a digital value representing a density level for each of a plurality of pixels.

28. A recording apparatus according to claim 27, wherein said second control means has a first mode to cause said light source to emit a light once in response to an input digital value for one pixel and a second mode to cause said light source to emit a light once in response to a plurality of digital values.

29. A recording apparatus according to claim 28, further comprising trimmable resistors corresponding to the first node and the second mode, respectively.

30. A recording apparatus according to claim 25, further comprising a first trimmable resistance device for setting a light emission period of said light source when a first digital value is supplied to said second control means and a second trimmable resistance device for setting the light emission period of said light source when a second digital value is supplied.

31. A recording apparatus according to claim 30, wherein said second control means has a first mode to cause said light source to emit a light once in response to an input digital value for one pixel and a second mode to cause said light source to emit a light once in response to a plurality of digital values.

32. A recording apparatus according to claim 31, wherein said first trimmable resistance device and said second trimmable resistance device include two trimmable resistance devices for said two modes, respectively.

33. A recording apparatus according to claim 30, wherein said second control means includes means for generating a pattern signal, DA conversion means for converting a digital value to an analog value, compare means for comparing the pattern signal with the analog signal, and adjusting means for adjusting to prevent the light emission period vet by the first trimmable resistor device from being affected by the second trimmable resistor device.

34. A recording apparatus according to claim 33, wherein said first trimmable resistor device and said second trimmable resistor device set first and second levels, respectively, for voltage dividing two voltages defining said pattern signal, and said adjusting means adjusts a characteristic of said DA conversion means in accordance with the first and second levels.

* * * * *

UNITED STATES PATENT AND TRADEMARK OFFICE
CERTIFICATE OF CORRECTION

PATENT NO. : 5,966,159
DATED : October 12, 1999
INVENTOR(S) : Yoshimi Ogasawara

It is certified that error appears in the above-identified patent and that said Letters Patent is hereby corrected as shown below:

<u>Title page,</u>
Item [56], References Cited,
OTHER PUBLICATIONS, under E.J. Kennedy, "Ampliofier" should read
-- Amplifier --.

<u>Column 2,</u>
Line 5, "noticable" should read -- noticeable --.

<u>Column 8,</u>
Line 33, "(Light" should read -- (light --.

<u>Column 10,</u>
Line 13, "be" should read -- in --.

<u>Column 11,</u>
Line 60, "fault" should read -- faulty --.

<u>Column 14,</u>
Line 60, "waited." should read -- awaited.--.

<u>Column 18,</u>
Line 11, "claim 13, "should read -- claim 10, --.

<u>Column 20,</u>
Line 10, "node" should read -- mode --; and
Line 35, "vet" should read -- set --.

Signed and Sealed this

First Day of January, 2002

*Attest:*

JAMES E. ROGAN
*Attesting Officer*  Director of the United States Patent and Trademark Office